(12) United States Patent
Chapin et al.

(10) Patent No.: US 8,981,925 B2
(45) Date of Patent: Mar. 17, 2015

(54) SYSTEM, METHOD, AND APPARATUS FOR DETECTING WIRELESS DEVICES

(71) Applicant: 3M Innovative Properties Company, St. Paul, MN (US)

(72) Inventors: Steven D. Chapin, Palm Harbor, FL (US); John C. Defant, New Port Richey, FL (US); David Segal, Palm Harbor, FL (US)

(73) Assignee: 3M Innovative Properties Company, St. Paul, MN (US)

( * ) Notice: Subject to any disclaimer, the term of this patent is extended or adjusted under 35 U.S.C. 154(b) by 194 days.

(21) Appl. No.: 13/792,727

(22) Filed: Mar. 11, 2013

(65) Prior Publication Data

US 2014/0253322 A1    Sep. 11, 2014

(51) Int. Cl.
*G08B 1/08* (2006.01)
*G08B 21/02* (2006.01)
*H04W 8/00* (2009.01)

(52) U.S. Cl.
CPC .............. *G08B 1/08* (2013.01); *G08B 21/0227* (2013.01); *H04W 8/005* (2013.01)
USPC ............... 340/539.11; 340/539.1; 340/539.16

(58) Field of Classification Search
None
See application file for complete search history.

(56) References Cited

U.S. PATENT DOCUMENTS

| | | | |
|---|---|---|---|
| 5,218,716 A | 6/1993 | Comroe et al. | |
| 5,295,180 A | 3/1994 | Vendetti et al. | |
| 5,515,042 A | 5/1996 | Nelson | |
| 5,959,533 A | * 9/1999 | Layson et al. | 340/573.1 |
| 6,011,973 A | 1/2000 | Valentine et al. | |
| 6,195,529 B1 | 2/2001 | Linz et al. | |
| 6,222,458 B1 | 4/2001 | Harris | |
| 6,381,533 B1 | 4/2002 | Crane et al. | |
| 6,393,254 B1 | 5/2002 | Pousada Carballo et al. | |
| 6,490,455 B1 | 12/2002 | Park et al. | |
| 6,502,022 B1 | 12/2002 | Chastain et al. | |
| 6,542,730 B1 | 4/2003 | Hosain | |
| 6,556,810 B2 | 4/2003 | Suzuki | |
| 6,643,517 B1 | 11/2003 | Steer | |
| 6,687,497 B1 | 2/2004 | Parvulescu et al. | |
| 6,687,506 B1 | 2/2004 | Girod | |
| 6,701,158 B2 | 3/2004 | Moreth | |
| 6,728,542 B2 | 4/2004 | Meda | |
| 6,771,946 B1 | 8/2004 | Oyaski | |
| 6,832,093 B1 | 12/2004 | Ranta | |
| 7,015,817 B2 | 3/2006 | Copley | |
| 7,027,619 B2 | 4/2006 | Pavlidis et al. | |
| 7,123,874 B1 | 10/2006 | Brennan | |

(Continued)

OTHER PUBLICATIONS

International Search Report for International Publication No. PCT/US2014/020261, dated May 12, 2014.

*Primary Examiner* — Travis Hunnings

(57) ABSTRACT

A system provides for radio frequency detection of an offending device within a specific range of a body worn device. Upon detection of the radio frequency signal, the body worn device communicates to an infrastructure to alert of the presence and optionally the location of the radio frequency signal, and therefore the offending device. The user and/or location of the body worn device is/are revealed and the source of the radio frequency signal is readily determined for confiscation of the offending device. Other features include locating/tracking of the body worn device (and wearer) detection of tampering with the body worn device, and detection of cloaking of the body worn device (e.g. submerging in water or covering with aluminum foil, etc.).

20 Claims, 16 Drawing Sheets

(56) References Cited

U.S. PATENT DOCUMENTS

| | | |
|---|---|---|
| 7,162,285 B2 | 1/2007 | Owens et al. |
| 7,181,229 B2 | 2/2007 | Singh et al. |
| 7,187,952 B2 | 3/2007 | Lin |
| 7,187,953 B2 | 3/2007 | Bauchot et al. |
| 7,292,848 B2 | 11/2007 | Mazzara, Jr. et al. |
| 7,653,385 B2 | 1/2010 | Arend et al. |
| 7,715,854 B2 | 5/2010 | Bogart |
| 7,876,205 B2 | 1/2011 | Catten et al. |
| 7,949,296 B2 | 5/2011 | Arend et al. |
| 8,019,354 B2 | 9/2011 | Rae et al. |
| 8,019,384 B2 | 9/2011 | Shah |
| 8,089,923 B2 | 1/2012 | Ito et al. |
| 8,131,205 B2 | 3/2012 | Rosen |
| 8,626,195 B2 | 1/2014 | Noonan |
| 2001/0050614 A1 | 12/2001 | Yang |
| 2003/0137408 A1 | 7/2003 | Breiner |
| 2004/0077339 A1 | 4/2004 | Martens |
| 2004/0198306 A1 | 10/2004 | Singh et al. |
| 2004/0246139 A1 | 12/2004 | Harris |
| 2005/0222933 A1* | 10/2005 | Wesby .................... 705/36 |
| 2006/0099940 A1 | 5/2006 | Pfleging et al. |
| 2006/0105701 A1 | 5/2006 | Cornwell |
| 2006/0252432 A1 | 11/2006 | Gruchala et al. |
| 2006/0286930 A1 | 12/2006 | Rathus et al. |
| 2007/0026850 A1 | 2/2007 | Keohane et al. |
| 2007/0035384 A1 | 2/2007 | Belcher et al. |
| 2007/0171047 A1* | 7/2007 | Goodman et al. ....... 340/539.13 |
| 2007/0254632 A1 | 11/2007 | Beadle et al. |
| 2007/0281603 A1 | 12/2007 | Nath et al. |
| 2008/0043993 A1* | 2/2008 | Johnson .................... 379/386 |
| 2009/0215387 A1 | 8/2009 | Brennan et al. |
| 2011/0059688 A1* | 3/2011 | Noonan et al. .............. 455/1 |
| 2013/0150004 A1* | 6/2013 | Rosen .................... 455/414.1 |

* cited by examiner

SYSTEM, METHOD, AND APPARATUS FOR DETECTING WIRELESS DEVICES

FIELD

This invention relates to the field of wireless and more particularly to a system for detecting wireless devices.

BACKGROUND

There are many situations when it is either not desired or not legal to utilize certain types of wireless communications. One good example is in the corrections environment, where the correctional institution forbids wireless communication by inmates because such communications are difficult or impossible to monitor and/or control. Law enforcement entities monitor telephone conversations conducted by inmates within correctional facilities for various reasons. The telecommunications equipment available for use by detainees within the corrections environment meet various requirements of governments and police by monitoring and/or recording telephone conversations as needed.

Cellular technology has progressed in form and size to a point that inmates in the corrections environment find ways to hide and smuggle cellular phones into corrections facilities. These phones are then used by inmates to circumvent the required monitoring and/or recording and are often used to communicate amongst themselves to coordinate unauthorized or dangerous activities within the corrections facility.

In correctional facilities, inmates are limited to a small number of individuals that they are permitted to call by way of an approval process. These often include family members, lawyers, and friends. All such calls take place in a very controlled environment, facilitating monitoring and recording, as necessary and legal. Normally, inmates are not permitted to make calls to certain individuals such as judges, jury members, witnesses, known accomplices, etc., to prevent harassing or other unwanted calls. Some correctional facilities also restrict the time of day and length of calls. Such monitoring is typically computer controlled at the correctional facility and/or at remote locations, at times, includes human monitoring and/or control. Additionally, certain laws and privacy norms prohibit recording of certain conversations such as conversations between an inmate and his/her attorney.

The penetration of, for example, cellular phones into many correctional facilities has become alarming. Imagine the harm that results in a purported killer having a smuggled cellular phone and calling judges and jury members every night with threats if he is convicted; or being able to continue with unlawful activity through the use of a cellular phone. Yet, cellular phones still find their way into such institutions and are well hidden. To avoid detection and to extend battery life, often the cellular phones are powered completely off when not in use, thereby not emitting any type of radio frequency signal until the inmate desires to make a call. Such devices are so small that they are easily hidden and, because there is no radio frequency emissions when powered off, such devices cannot be detected by radio frequency sweeps of the inmate areas (e.g. cells, common areas, etc.).

In the past, attempts at detecting cellular activity within correctional facilities typically consisted of fixed antenna systems, in which, antenna are strategically located throughout the correctional facility and the radio frequency bands used by cellular phones are monitored, reporting detection to a central location. Such systems require an expensive, fixed infrastructure within the correctional facility and only determine that a cellular phone is in use, being incapable of pinpointing the actual user.

Other systems utilize one or more fixed antenna within the facility that terminate the unwanted cellular calls, acting as the cellular phone network, thereby making it difficult or impossible to initiate a call from a cellular phone within the facility. As with the prior attempts, this too does not pinpoint the actual inmate making the call. Furthermore, because signals from this system may extend beyond the prison walls, this system is capable of inadvertently blocking a valid call which could be disastrous if such a call was an emergency call. There are also questions as to whether such a system would be approved for operation by government agencies such as the FCC in the United States. Similarly, jamming devices are available to prevent connections between these cellular phones and the cellular network/towers, but it is also difficult to assure that such jamming devices will not interfere with legitimate calls, especially emergency calls and, again, there are questions related to approval by government agencies.

Another prior attempt to find cellular phones includes portable detection devices that monitor and detect radio frequency emissions in the cellular range. Such devices have been found to be less reliable because, in a prison environment, often there is a tight inmate communication system (e.g. signaling by making certain noises, etc.) that alerts the inmate who is using the cellular phone that a guard is coming in sufficient time as to power down and/or hide the phone before the guard can pinpoint the radio frequency signal. The use of phone (electronics) sniffing dogs faces similar issues when used as the primary means of cell phone detection.

What is needed is a system that will detect and pinpoint radio frequency usage for locating and confiscating of unauthorized communications equipment and report any detected devices.

SUMMARY

The basic system provides for radio frequency detection of a device within a specific range of a body worn device. Upon detection of a targeted radio frequency signal, the body worn device communicates to an infrastructure to alert of the presence of the radio frequency signal. The user and/or location of the body worn device is/are revealed and the source of the radio frequency signal is readily determined for confiscation of the offending device. Other features include locating/tracking of the body worn device (and wearer) detection of tampering with or removal of the body worn device, detection of cloaking of the body worn device (e.g. submerging in water or covering with aluminum foil, etc.), and various internal diagnostics.

Although there are many applications of the described body worn device(s), one exemplary use is within correctional facilities. As noted above, various communications devices are often smuggled into correctional facilities and are easily hidden. The use of such devices is not allowed, but still happens. By equipping at least a subset of the inmate population with the disclosed body worn devices, the correctional facility staff is provided the ability to locate any covered radio frequency emitting device within the correctional facility. Guards and staff are alerted when the inmate wearing the body worn device or someone close to that inmate uses a targeted wireless device, such as a cellular phone. Once alerted, the guards know the exact identification of the inmate and, therefore, the location of the illegal device enabling confiscation of the illegal device.

In one embodiment, a system for detecting radio frequency emitting devices is disclosed including at least one base station. The base station includes a base station processor and a base station transceiver which is operatively coupled to the base station processor. A plurality of body worn devices is provided. Each body worn device has a processor, a transceiver operatively coupled to the processor, a radio frequency detector operatively coupled to the processor, and a source of power for providing operational power to the processor, the transceiver, and the radio frequency detector. Software running on the processor of the body worn device communicates with the radio frequency detector and, if a target radio frequency is detected by the radio frequency detector, the software initiates a communication from the transceiver to the base station transceiver indicating that the target radio frequency was detected. Upon receipt of the communication indicating that the target radio frequency was detected, software running on the base station processor determines the offending body worn device and signals an alert.

In another embodiment, a method of detecting a radio frequency emission is disclosed. The method includes monitoring a predetermined radio frequency (or frequencies) at a body worn device and, if the predetermined radio frequency of at least a predetermined radio frequency strength is detected, transmitting a signal from a transmitter of the body worn device to a receiver of a base station, the signal including an identification of the body worn device. Upon receiving the signal, the base station issues an alarm indicative of the predetermined radio frequency and the identification of the body worn device.

In another embodiment, a computer-based system for detecting radio frequency transmissions is disclosed includes a body worn device. The body worn device has a processor, a wireless transceiver communicatively coupled to the processor, and a radio frequency transmission detector interfaced to the processor. The radio frequency transmission detector detects any radio frequency transmission of at least one frequency and at a power level above a predetermined threshold for each of the at least one frequency. The computer-based system also includes a base station that has a base station processor and a base station transceiver. The base station transceiver is wirelessly coupled to the wireless transceiver of the body worn device, thereby providing a wireless communication channel between the processor of the body worn device and the base station processor. Software running on the processor monitors the radio frequency transmission detector and, upon detection of any of the at least one frequency exceeding a corresponding threshold of the predetermined threshold for each of the at least one frequency, the processor formats a signal (e.g. prepares a packet) and sends the signal (e.g. packet) through the wireless communication channel to the base station processor. Software running on the base station processor monitors the base station transceiver and upon detection of the signal, the software running on the base station processor signals an alarm (e.g., displays a message, sounds an alarm, etc).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
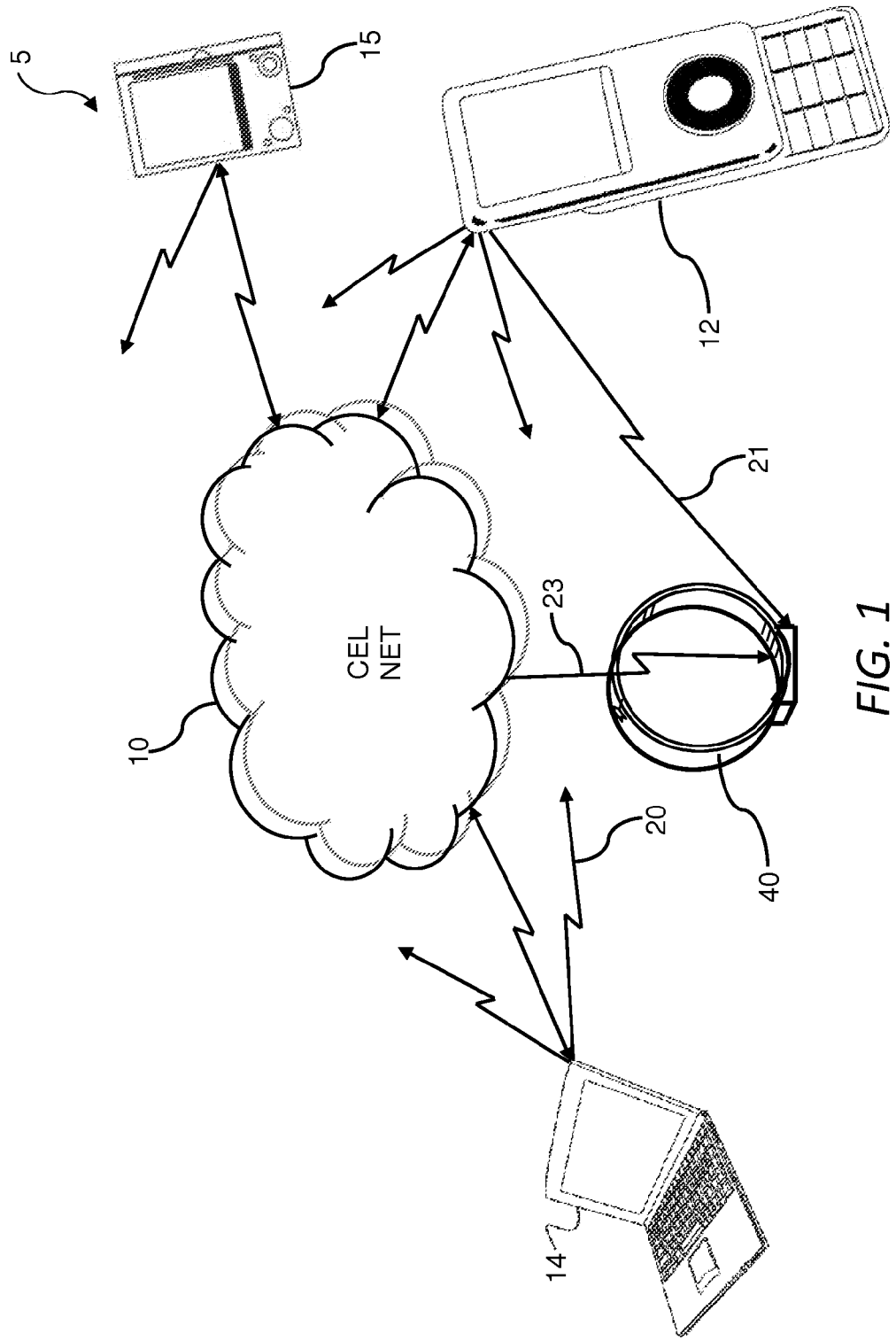
FIG. 1 illustrates a schematic view of a typical wireless communication system and body worn device.

Reference will now be made in detail to the presently preferred embodiments of the invention, examples of which are illustrated in the accompanying drawings. Throughout the following detailed description, the same reference numerals refer to the same elements in all figures.

The described system pertains to a collection of hardware devices for monitoring the location and environment of any target person. Throughout this description, the target person is typically a detained person such as an inmate in a correctional facility, but there is no restriction to any particular type of target person, nor that the target be a human being, in that the described body worn device functions the same for any type of movable object. The described system is equally applicable to any other type of scenario. For example, the target person is a teen child and the body worn device is worn by the teen child to monitor, for example, cell phone usage while driving.

For simplicity purposes, the following description uses, as an example, the inmate as the target person. In general, depending upon security and policies at a prison, the population (inmates) is not allowed to communicate with those outside the prison without using approved forms of communication that are easily monitored by prison authorities. In such, the inmate population is not allowed to use pagers, cellular phones, cordless phones, wireless Internet access, etc., to communicate with anybody, within or outside of the prison. Attempts to keep devices capable of such communications out of the hands of inmates has proved ineffective, in that inmates have long periods of time to think of ways to smuggle communications devices into the prison and, to hide those devices once the devices are within the prison. This is further exacerbated by potential corruption within the prison staff and guards.

Referring to FIG. 1, a schematic view of a typical wireless communication system 5 is shown, in which a body worn device 40 is present. The overall structure, communication paths, and connection relationships shown are one example of a wireless communication system 5 and are not meant to limit this disclosure in any way. Many different organizations, protocols, operating frequencies (bands), and architectures are anticipated and all of such are included here within. The system is intended to operate with any known network 10, including all known and future wireless networks 10 or point-to-point systems. Wireless networks, are for example, the cellular phone network (e.g., GSM, CDMA, AMPS, etc.), wireless Internet (e.g. WiFi-802.11x, etc.), etc. Point-to-point systems include Bluetooth, citizen band radios, walkie-talkie radios, and any other licensed or unlicensed forms of wireless communications. These communication system enable any number of end-user terminals 12/14/15 (e.g. cellular phones 12, personal computers 14, tablets 15, etc.) to communicate wirelessly with each other or through a network such as the cellular network 10 as shown to other devices, either within the network 10 or external (e.g. land-line phones, etc.). As known in the industry, the network 10 often consists of one or more devices such as cellular towers, repeaters, wireless network adapters, etc., which are not shown for brevity reasons.

Throughout this description, a cellular network 10 is used as an example, though such is not to be interpreted as limiting in any way. In the example of the cellular network 10, each device 12/14/15 communicates with cellular towers (not shown for brevity reasons) utilizing a pre-defined protocol and a pre-defined frequency or set of frequencies. As known in the industry, cellular networks 10 are assigned a set of frequencies in which they are allowed to operate (in the US the assignment is made by the Federal Communications Commission or FCC), and, depending upon the protocol, the frequencies are allocated for certain parts of the protocol such as signaling (e.g. indicating the desire to make a connection), voice communications, data communications, etc. It is also known, based upon the protocol, how to process/avoid collisions (e.g. two cellular phones 12 attempt to initiate a call at the same time), how to handle varying distances from the cellular towers (e.g. measuring signal strength and signaling a request for increases or decreases in power output), and how to hand off a cellular phone from one cellular tower to the next, etc.

Whatever the wireless communications being used, every device 12/14/15 must, at some time, emit a radio frequency signal 20 that is then hopefully received by one or more receivers within the network 10. Although it is desired to communicate such radio frequency signals 20 directly to the network 10 (or other device in a point-to-point system), the laws of physics do not cooperate and the radio frequency signal 20 radiates in multiple directions from an antenna, the antenna being within (or external to) the transmitting device 12/14/15. For example, when the cellular phone 12 communicates to the cellular network 10, some portion of the radio frequency signal 21 reaches an antenna within the body worn device 40. Likewise, when the cellular network 10 communicates to the cellular phone 12, some portion of the radio frequency signal 23 also reaches an antenna within the body worn device 40. In this way, the body worn device 40 receives some portion of the radio frequency energy emitted from any device 12/14/15 or network 10 that is within range (e.g. the signal strength of the radio frequency is sufficient for the body worn device to detect).

Within the body worn device 40 is circuitry 50/50A (see FIGS. 2 and 3) that implement the various features of the wireless system including some or all of radio frequency detection, communications, tamper detection, positioning, and powering of the above.

Figure 2:
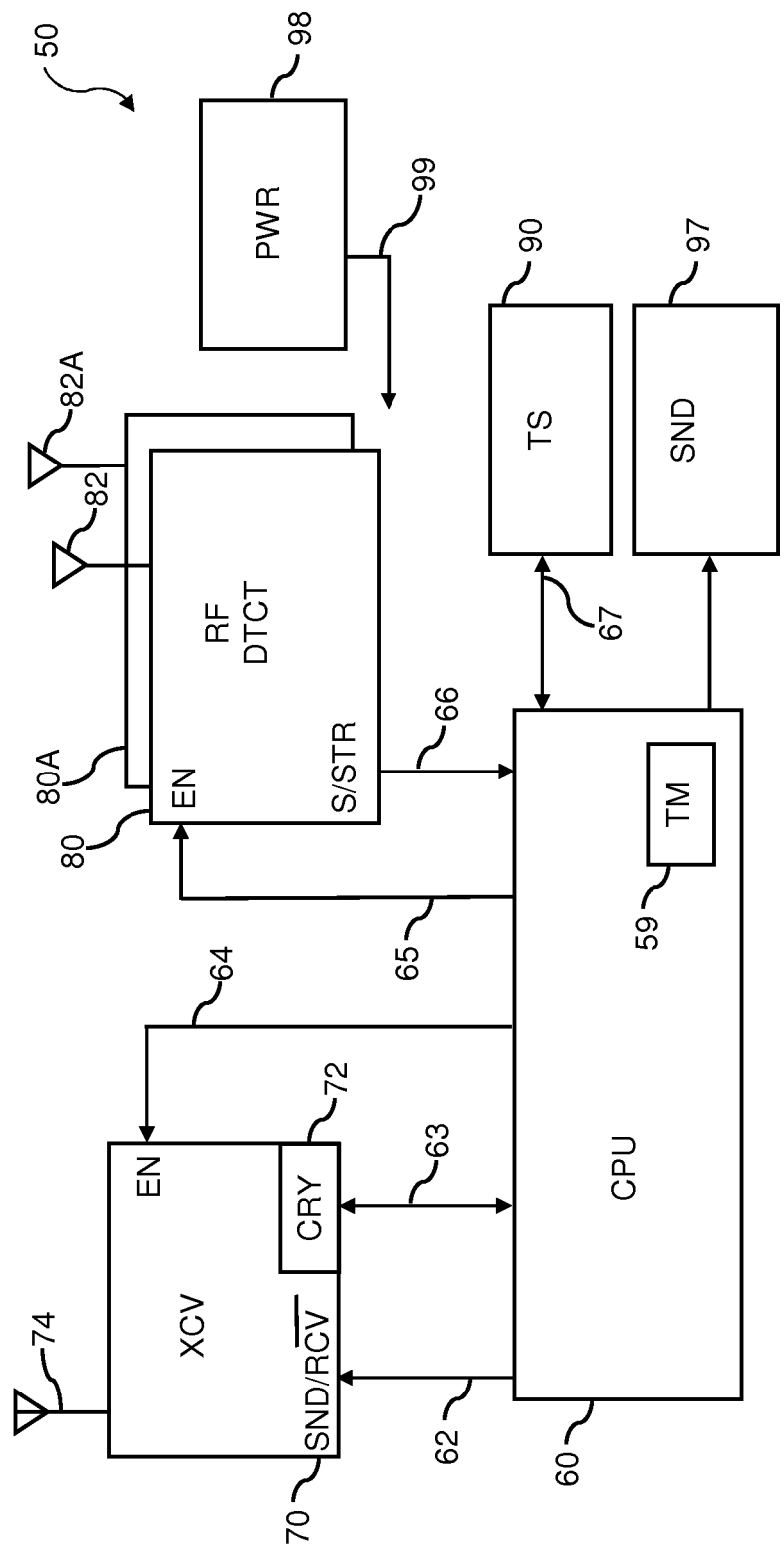
FIG. 2 illustrates a block diagram of a body worn device.

Referring to FIG. 2, a block diagram of the body worn device circuitry 50 is shown. The various communications paths 62/63/64/65/66/67 are examples and any number, type, and directionality of communications paths are anticipated to accomplish the functionality described here within. In some embodiments, a bus architecture is used to implement the communications paths 62/63/64/65/66/67, while in other embodiments, direct connections, serial links, input output pins/ports, etc., are used to signal between the various subsystems 60/70/80/90 as known in the industry.

The body worn device circuitry 50 includes a source of power 98. It is well known how to power such devices ranging from simple body worn devices such as watches to more complicated devices that are often body worn such as cellular phones, to specialized worn devices such as house-arrest tracking devices. Any source(s) of power are anticipated, including, but not limited to, batteries, rechargeable batteries, solar cells, radio frequency parasitic extraction, capacitors, super capacitors, fuel cells, etc., including combinations of such. The source of power 98 includes circuitry to condition and regulate the power which is then distributed to the various subsystems 60/70/80/90 by power distribution 99 which are any known conductor 99 as used in the industry, including, but not limited to, wires, printed circuit paths, etc. In some embodiments, the source of power 98 further includes circuitry to control charging as well as a connection or interface to a source of charging power.

The radio frequency detection subsystem 80/80A is interfaced to the processor 60. The processor controls the operation of the radio frequency detection subsystem 80/80A by sending commands 65 to the radio frequency detection subsystem 80/80A and receiving status and data back 66 in a similar manner (e.g. signal frequency and strength). The radio frequency detection subsystem 80/80A includes one or more antenna 82/82A as needed, either internal or external to an enclosure 41 of the body worn device 40. Although, for completeness, two radio frequency detectors 80/80A are shown, each detecting a specific frequency range or band of radio frequency energy, any number of radio frequency detectors 80/80A are anticipated, each having as many antenna 82/82A as needed to properly detect the targeted radio frequency or radio frequency spectrum. For example, in some embodiments, there is a single radio frequency detector 80 having a single antenna 82. In another exemplary embodiment, there is a single radio frequency detector 80 having two antennas 82/82A which are switched or mixed as known in the industry. In another exemplary embodiment, there are two radio frequency detectors 80/80A, each having one antenna 82/82A. Again, any number of radio frequency detectors 80/80A with any number of antenna 82/82A are anticipated with any type of antenna.

In some embodiments, the radio frequency detection subsystem 80 operates independently of the controller 60, notifying the controller 60 of the detection of any of the targeted radio frequencies (e.g. cellular band frequencies, etc.). In some embodiments, the controller 60 performs some of the radio frequency detection, such as setting or sweeping the detection frequency and comparing the received radio frequency power levels at each frequency to a predetermined acceptable value. For example, the controller 60 instructs the radio frequency detector 80 to monitor three specific frequency, such as 900 MHz, 1.8 GHz and 1.9 Ghz, and then reads back a signal strength from the radio frequency detector 80, comparing the signal strength to an internal threshold, signaling an alert (as will be discussed with FIG. 14) if the threshold is exceeded. There are many divisions of the detection functionality anticipated and the disclosed system is not limited in any way to any particular implementation of the disclosed functionality. In some embodiments, there is a threshold for each frequency or range of frequencies; while in other embodiments there is a single threshold that applies to all frequencies. In some embodiments, the radio frequency detector analyzes the radio frequency signals to determine the type of signal in addition to the signal strength (e.g. is it a random radio frequency signal or is it encoded with cellular packets?).

The tamper detection subsystem 90 is also interfaced to the processor 60. The processor 60 controls the operation of the tamper detection subsystem 90 by sending commands and/or signals to the tamper detection subsystem 90 and receiving status and data back in a similar manner 67 (e.g. intact or "device removed from body," etc.). It is anticipated that the body worn device 40 is issued to a particular individual (e.g. inmate) and is to be locked onto that person by, for example, a leg cuff, arm cuff, neck cuff, belt, etc. Although the body worn device 40 is secured to the person and not easily removed, it is important that any tampering with the body worn device 40 be detected (and reported). There are many methods of detecting tampering or removal of a body worn device 40 known in the industry, all of which are anticipated and included here within. For example, in some embodiments, a conduction path fully encircles the body appendage to which the body worn device 40 is attached such that, if the strap 41 (see FIG. 4) is cut, the circuit opens and the open circuit is detected by the tamper detection system 90. This is a somewhat simple method that is used as an example; in that, a clever person can expose the conductor in two locations, attach an end of a wire to the conductor in each location, then cut through the strap in between the two locations without detection. In some embodiments, more elaborate measurements are used to detect the added resistance (or change in resistance) of the external wire. In some embodiments, an optical light pipe connected at both ends to the body worn device 40 encircles the appendage and a particular wavelength(s) of light or an encoded light wave signal is emitted into one end of the light pipe. If the signal is detected at the other end, then it is believed that no tampering has occurred, but if the signal is not detected, then tampering is detected and an appropriate alert is transmitted as will be described. There are many types of tamper detection devices anticipated including the above and/or any other type of tamper detection including, but not limited to, motion sensors and accelerometers (e.g. if no movement is detected for a long period of time it is assumed that the body worn device 40 has been removed from the body).

In some embodiments, the tamper detection subsystem 90 also includes intrusion detection to determine if the housing 41 (see FIG. 4) around the electronics has been penetrated. Again, there are many ways to detect such intrusion as known in the industry, all of which are included here within. For example, a simple method includes the detection of light within the housing 41 (see FIG. 4). Normally, there is no light being that the housing 41 is made of a non-light transmitting material and completely sealed with no openings, but when the housing 41 is compromised, light is allowed to enter the housing 41 and triggers the tamper detection system 90. In other embodiments, there is an internal detector that detects one or more materials or physical state normally present in the atmosphere (e.g. change in pressure, humidity, oxygen, nitrogen, etc.) and the housing 41 is either evacuated or filled with some other gas (e.g. helium). In this, normally, the detector measures little or no presence of the material, but when the housing 41 is cut, atmosphere enters the housing, the material is detected, and the tamper detection system 90 is triggered.

The body worn device circuitry 50 communicates with the land based system (e.g. base stations 110) through a wireless transceiver 70, preferably having an antenna 74, though in some embodiments, the transceiver 70 utilizes the antenna 82 used in radio frequency detection through, for example, a splitter or antenna switch (not shown). The wireless transceiver 70 is interfaced to the processor 60 and the processor 60 communicates with and controls the operation of the wireless interface and transceiver 70 by sending commands 62 and data 63 to the wireless transceiver 70 and receiving status and data back in a similar manner 63. Because such transceivers often consume significant power, in some embodiments, the processor 60 has an enable interface 64 to power down the transceiver 70 (or any other subsystem) when not in use. Any appropriate signaling protocol is anticipated, as transmission collisions with other body worn devices 40, lost packets, out-of-order packets, noise, etc., must be overcome. The data and signaling is modulated onto a radio frequency using any known modulation format such as frequency modulation, amplitude modulation, pulse code modulation, pulse width modulation, etc.

It is anticipated that the transceiver 70 be any type of transceiver, operating over any known frequency or group of frequencies, any known power level(s), and either half-duplex or full-duplex. When the transceiver 70 is half-duplex, the processor 60 controls whether the transceiver is receiving or it is transmitting by a mode control 62.

Data is transferred between the processor 60 and the transceiver 70 in any way known in the industry including, but not limited to, shared memory (not shown), serial transfer, parallel transfer, any combination, etc. In a preferred embodiment, though not required, data from the processor 60 is encrypted before transmission. In such, the data is either encrypted by instructions running on the processor 60, or, in some embodiments, by an encryption module 72 within or external to the transceiver 70. Also in a preferred embodiment, though not required, data from the base station 110 (see FIG. 6) is encrypted before transmission. In such, the encrypted data is received by the transceiver 70, and then the encrypted data is either decrypted by instructions running on the processor 60, or, in some embodiments, by a hardware encryption module 72 within or external to the transceiver 70.

Figure 16:
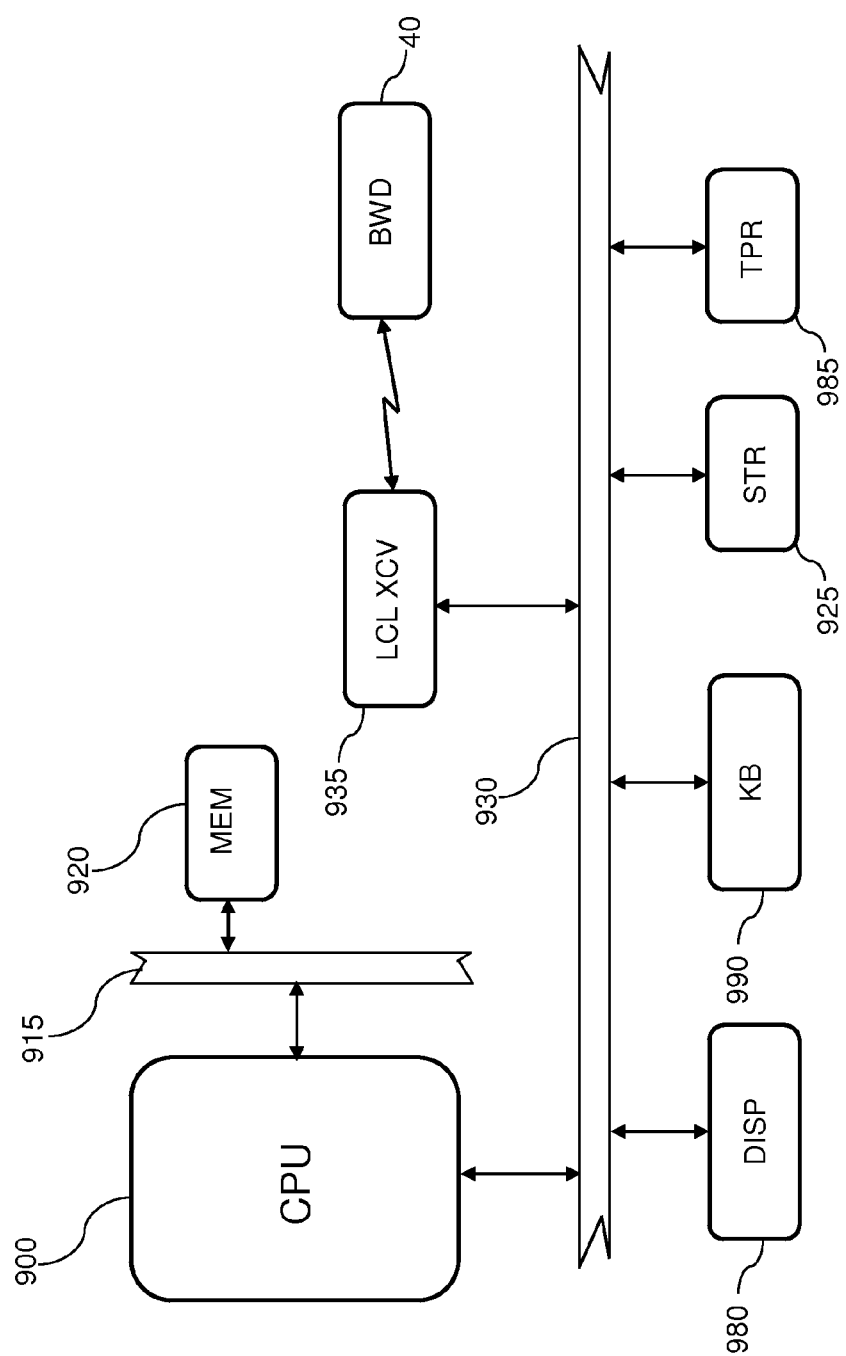
FIG. 16 illustrates a schematic view of an exemplary system of a base station.

Any band, frequency, wavelength, set of wavelengths, protocols, protocol stacks are anticipated for use by the transceiver 70 (and transceiver 935 in FIG. 16). There are many protocols and protocol options that provide various transmission capabilities to improve reliability of communications, reduction or elimination of transmission errors, and/or efficiencies in both spectrum usage as well as power consumption. For example, especially in systems that include heartbeat transmissions, it is known to provide each body worn device 40 with a predetermined back-off period or, instead, a random back-off period is created by the controller 60 such that timing of transmissions are controlled to reduce collisions between multiple body worn devices 40. In such, for example, if there are 600 body worn devices 40 and each emits a heartbeat every hour, it is preferred that the heartbeat transmissions are distributed either sequentially or randomly over that hour, such that, for example, during any given minute, 10 of these body worn devices 40 transmit heartbeats and, preferably, these 10 transmissions are distributed either sequentially or randomly over that minute, to further reduce collisions.

In some embodiments, a piezoelectric or other sound emitting device 99 is included. The sound emitting device 97 emits a sound as an audible alert when an event such as tampering or a targeted RF signal is detected. The audible alert from the sound emitting device is used to augment the wireless delivery of the alert information or as an alternative. For example, if a wireless communication fails, the audible alert is initiated.

In some embodiments, a clock or timekeeper 59 is included, either as a subsystem of the controller 60 or a separate, discrete timing device 59 that is interface to the controller 60. In such embodiments, the body worn device 40 has the ability to record the time and/or date of any event and to transmit the time and/or date to the base station 110 along with any alert and/or heartbeat transmission.

Figure 3:
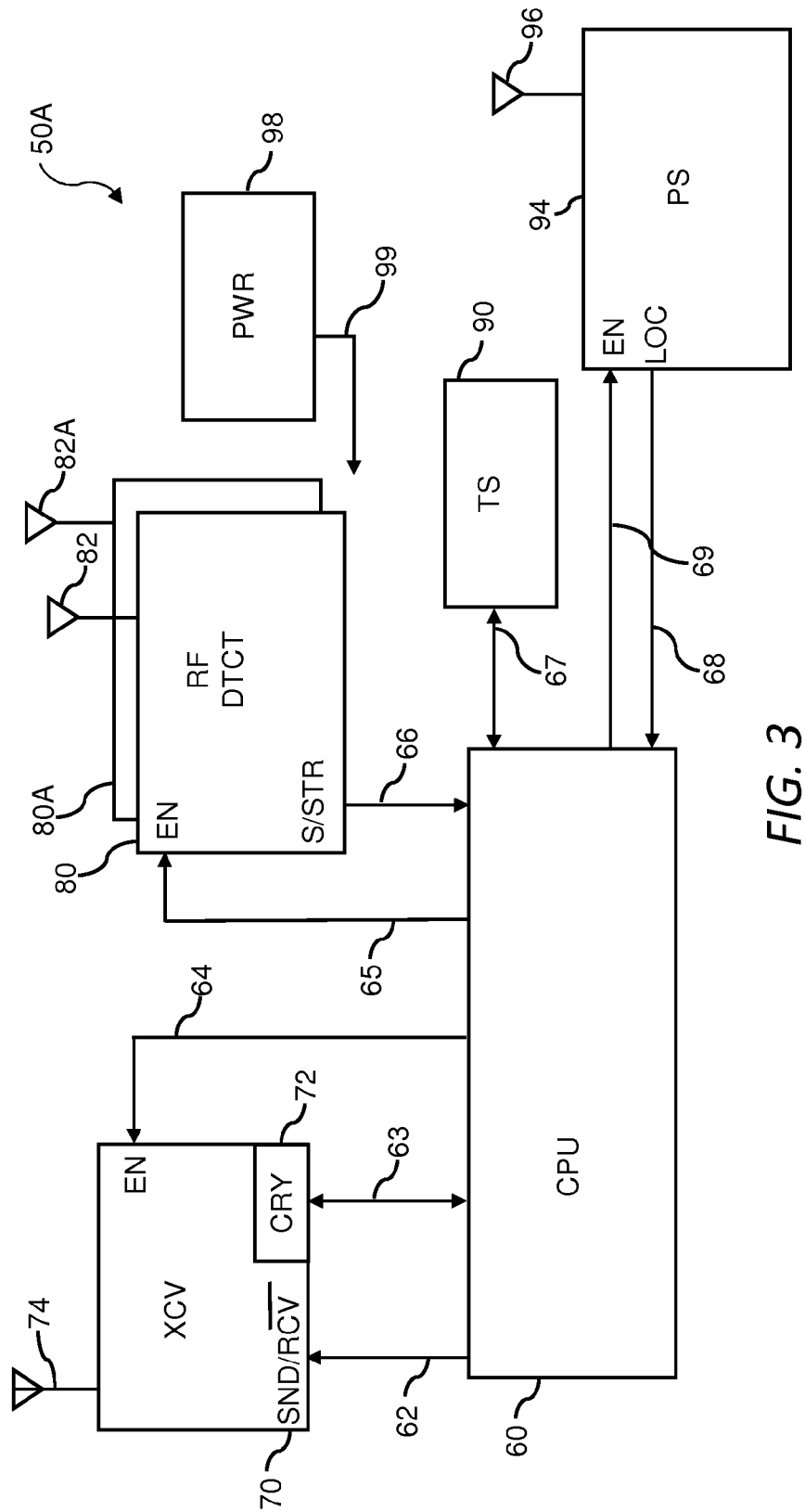
FIG. 3 illustrates a block diagram of a second body worn device.

Referring to FIG. 3, a block diagram of body worn device circuitry 50A with Global Positioning is shown. The various communications paths 62/63/64/65/66/67/68/69 are examples and any number, type, and directionality of communications paths are anticipated to accomplish the functionality described here within. In some embodiments, a bus architecture is used to implement the communications paths 62/63/64/65/66/67/68/69, while in other embodiments, direct connections, serial links, input output pins/ports, etc., are used to signal between the various subsystems 60/70/80/90/94.

The body worn device circuitry 50A includes a source of power 98. It is well known how to power such devices ranging from simple body worn devices such as watches to more complicated devices that are often body worn such as cellular phones, to specialized worn devices such as house-arrest tracking devices. Any source(s) of power are anticipated, including, but not limited to, batteries, rechargeable batteries, solar cells, radio frequency parasitic extraction, capacitors, super capacitors, fuel cells, etc., including combinations of such. The source of power 98 includes circuitry to condition and regulate the power which is then distributed to the various subsystems 60/70/80/90/94 by conductors 99 which are any known conductor 99 as used in the industry, including, but not limited to, wires, printed circuit paths, etc. In some embodiments, the source of power 98 further includes circuitry to control charging as well as a connection or interface to a source of charging power.

The radio frequency detection subsystem 80/80A is interfaced to the processor 60. The processor controls the operation of the radio frequency detection subsystem 80/80A by sending commands 65 to the radio frequency detection subsystem 80/80A and receiving status and data back 66 in a similar manner (e.g. signal frequency and strength). The radio frequency detection subsystem 80/80A includes one or more antenna 82/82A as needed, either internal or external to an enclosure 41 (see FIG. 4) of the body worn device 40. Although, for completeness, two radio frequency detectors 80/80A are shown, each detecting a specific frequency range or band of radio frequency energy, any number of radio frequency detectors 80/80A are anticipated, each having as many antenna 82/82A as needed to properly detect the targeted radio frequency or radio frequency spectrum. For example, in some embodiments, there is a single radio frequency detector 80 having a single antenna 82. In another exemplary embodiment, there is a single radio frequency detector 80 having two antennas 82/82A which are switched or mixed as known in the industry. In another exemplary embodiment, there are two radio frequency detectors 80/80A, each having one antenna 82/82A. Again, any number of radio frequency detectors 80/80A with any number of antenna 82/82A are anticipated with any type of antenna.

The tamper detection subsystem 90 is also interfaced to the processor 60. The processor 60 controls the operation of the tamper detection subsystem 90 by sending commands and/or signals to the tamper detection subsystem 90 and receiving status and data back in a similar manner 67 (e.g. intact or "device removed from body," etc.). It is anticipated that the body worn device 40 is issued to a particular individual (e.g. inmate) and is to be locked onto that person by, for example, a leg cuff, arm cuff, neck cuff, belt, etc. Although the body worn device 40 is secured to the person and not easily removed, it is important that any tampering with the body worn device 40 be detected. There are many methods of detecting tampering or removal of a body worn device 40 known in the industry, all of which are anticipated and included here within. For example, in some embodiments, a conduction path fully encircles the body appendage to which the body worn device 40 is attached such that, if the strap 42 (see FIG. 4) is cut, the circuit opens and is detected by the tamper detection system 90. This is a somewhat simple method that is used as an example; in that, a clever person can expose the conductor in two locations, attach ends of a wire to the conductor in each location, then cut through the strap 42 in between the two locations without detection.

In some embodiments, a method of determining the body worn device's proximity to the body is used to determine if the device has been removed. Some methods known in the industry for detecting proximity include continuity sensors and mechanical switches that determine if the device is no longer in contact with the body. Such continuity sensors and mechanical switches are prone to false positives and nuisance alerts and can be defeated more easily than other methods.

In some embodiments, more elaborate measurements are used to detect the added resistance (or change in resistance) of the external wire. In some embodiments, an optical light pipe embedded in a strap encircles the body part to which the body worn device 40 is attached and a specific wavelength an encoded light wave signal is emitted or periodically emitted into one end of the light pipe. If the same signal is detected at the other end, then it is believed that no tampering has been done, but if the signal is not detected, then tampering is detected.

In some embodiments, the tamper detection subsystem 90 also includes intrusion detection to determine if the housing 41 around the electronics has been penetrated. Again, there are many ways to detect such intrusion as known in the industry, all of which are included here within. For example, a simple method includes the detection of light within the housing 41. Normally, there is no light being that the housing 41 is completely sealed with no openings, but when the housing 41 is penetrated, light is allowed to enter and triggers the tamper detection system 90. In other embodiments, there is an internal detector that detects one or more materials or physics typically present in the atmosphere (e.g., atmospheric pressure, humidity, oxygen, nitrogen, etc.) and the housing 41 is either evacuated or filled with some other gas (e.g. helium). In this, normally, the detector measures little or no presence of the material, but when the housing 41 is cut, atmosphere enters the housing 41, the material is detected, and the tamper detection system 90 is triggered.

There are many tamper detection mechanisms known in the industry, all of which are anticipated for use with the body worn device 40. Further examples include the use of a motion sensor or accelerometer to determine if the device experiences long periods of time with no motion, indicating that the device has been removed and has been placed somewhere in a static mode.

The body worn device 40 communicates with the land based system (e.g. base stations 110) through a wireless device 70, preferably a transceiver having an antenna 74, though in some embodiments, the transceiver 70 utilizes the antenna 82 used in radio frequency detection through, for example, a splitter or antenna switch (not shown). The wireless transceiver 70 is interfaced to the processor 60 and the processor 60 communicates with and controls the operation of the wireless interface and transceiver 70 by sending commands 62 and data 63 to the wireless transceiver 70 and receiving status and data back in a similar manner 63. Because such transceivers often consume significant power, in some embodiments, the processor 60 has an enable interface 64 to power down the transceiver 70 (or any other subsystem such as the positioning subsystem 94) when not in use.

Throughout this description, the wireless device 70 is referred to as a transceiver 70, which is the preferred form of communications with the base station 110. The wireless transceiver 70 transmits a wireless signal to the base station and receives a wireless signal back, either on the same band/wavelength/frequency or a different band/wave/frequency utilizing any protocol or stack of protocols. For example, if a signal/message from the transceiver 70 of the body worn device 40 is not received and acknowledged by the transceiver 935 (see FIG. 16) within a protocol timeout period or if it is received with errors and negatively acknowledged, the signal/message is retransmitted. In embodiments in which the wireless device 70 is a transmit-only device, there is no acknowledgement possible and no mechanism to determine if the transmission succeeded.

It is anticipated that the transceiver 70 be any type of transceiver, operating over any known frequency or group of frequencies, using any known modulation technique, at any known power level(s), and either half-duplex or full-duplex. When the transceiver 70 is half-duplex, the processor 60 controls whether the transceiver is receiving or it is transmitting by a mode control 62.

Data is transferred between the processor 60 and the transceiver 70 in any way known in the industry including, but not limited to, shared memory (not shown), serial transfer, parallel transfer, any combination, etc. In a preferred embodiment, though not required, data from the processor 60 is encrypted before transmission. In such, the data is either encrypted by instructions running on the processor 60, or, in some embodiments, by an encryption module 72 within or external to the transceiver 70. Also in a preferred embodiment, though not required, data from the base station 110 (see FIG. 6) is encrypted before transmission. In such, the encrypted data is received by the transceiver 70, and then the encrypted data is either decrypted by instructions running on the processor 60, or, in some embodiments, by a encryption module 72 within or external to the transceiver 70.

In the embodiment of FIG. 3, positioning capability is included. For example, a Global Positioning Satellite Receiver 94 is interfaced to the processor 60. In such, the processor controls the Global Positioning Satellite Receiver 94 operation by sending commands 69 to the Global Positioning Satellite Receiver 94 and receiving status and data 68 from the Global Positioning Satellite Receiver 94 (e.g. latitude and longitude). Typically, the Global Positioning Satellite Receiver 94 has a specialized antenna 96 or array of antenna 96. Any known type of positioning system is anticipated for use with the body worn device 40.

Figure 4:
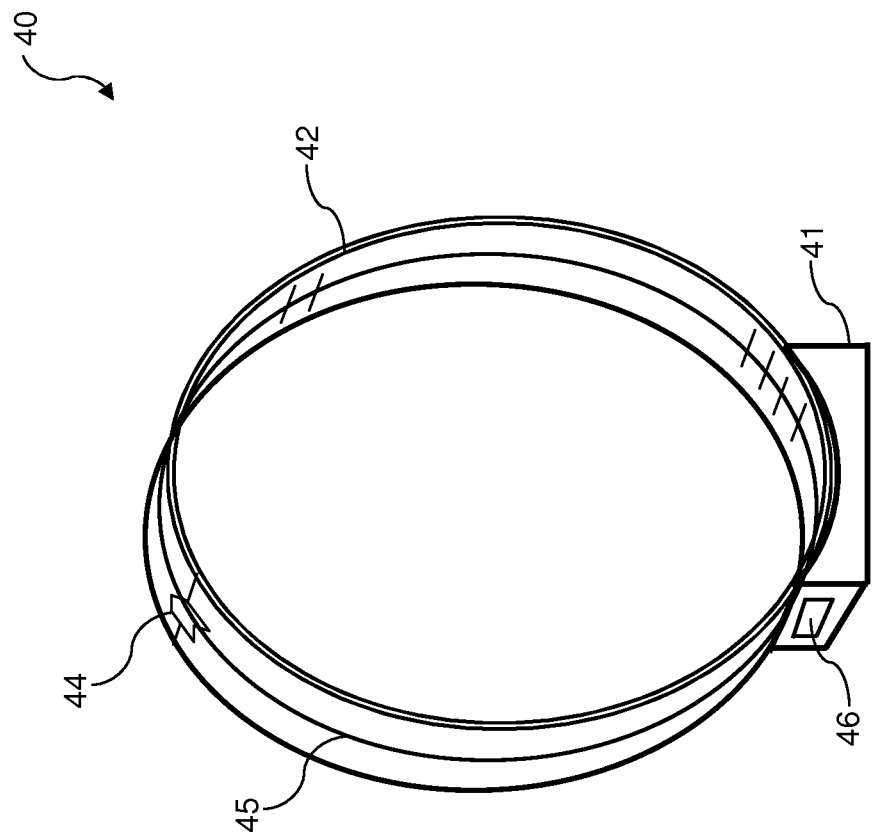
FIG. 4 illustrates a perspective view of an exemplary body worn device.

Referring to FIG. 4, a perspective view of an exemplary body worn device 40 is shown. In this example, the body worn device 40 is a collar 40, such as a leg collar 40, arm collar 40, or neck collar 40, while in other embodiments; the body worn device 40 is of slightly different forms for attachment to the body in different ways such as by a belt-like system. In the exemplary body worn device 40 shown in FIG. 4, some or all of the electronics 50/50A are located within an enclosure 41 that is made as part of the strap 42 or affixed to the strap 42 so as to resist removal and/or intrusion. The strap 42 is locked closed after placing around the person's appendage, for example by a non-removable lock 44. In some embodiments, the lock 44 is part of the enclosure 41. In some embodiments, the lock includes a one-way closure system in which, the strap 42 is tightened around an appendage by capturing more of the strap 42 through the one-way closure system, then cutting off any excess strap 42. In some embodiments, especially those with electronics, conductors, and/or light pipes within the strap 42, the strap 42 is of fixed length and locks into the enclosure 41, completing the tamper detection circuit. In the industry of inmate or release monitoring (e.g. house arrest), it is well known how to attach similar devices to a person and to detect tampering and/or removal, all of which are anticipated and included here within.

Although any form of attachment mechanism is anticipated for the body worn device 40, in some embodiments, the attachment mechanisms and enclosure 41 are designed to prevent removal under normal wear and impact that often occurs during the wearing of such device such as, during exercise, walking, running, etc. Furthermore, in some embodiments, the attachment mechanisms and enclosure 41 are designed to resist penetration by substances that normally contact the wearer such as during showering, rain, etc. Although any suitable material is anticipated, it is preferred that at least the surface of the strap 42 and/or enclosure 41 be made from a hypoallergenic material such as Santoprene, being that the body worn device 40 will be worn for long periods of time. It is also preferred that the strap 42 be made from materials that will not significantly stretch, even when heated. Stretching is not desired because, in some cases, stretching enables easy removal without detection of tampering. In some embodiments, the enclosure 41 is made of an impact resistant polycarbonate that is rugged, tamper resistant, and seals the electronics from the surrounding environment.

As previously described, in some embodiments, the body worn device 40 includes a perimeter detection loop 45 that consists of a conductor 45 (either light or electrical signal) that helps detect tampering. For example, if the strap 42 is cut, the perimeter detection loop 45 is broken and a tamper signal is sent from the transceiver 70 of the body worn device 40 to the base station 110.

In some embodiments, an RFID 46 is mounted in/on the enclosure 41 and/or in the strap 42. This optional RFID (or other readable mechanism such as a bar code, QR code, etc.) is available for use to facility systems for many uses such as head counts, usage accounting, commissary expense charges, etc.

Figure 5:
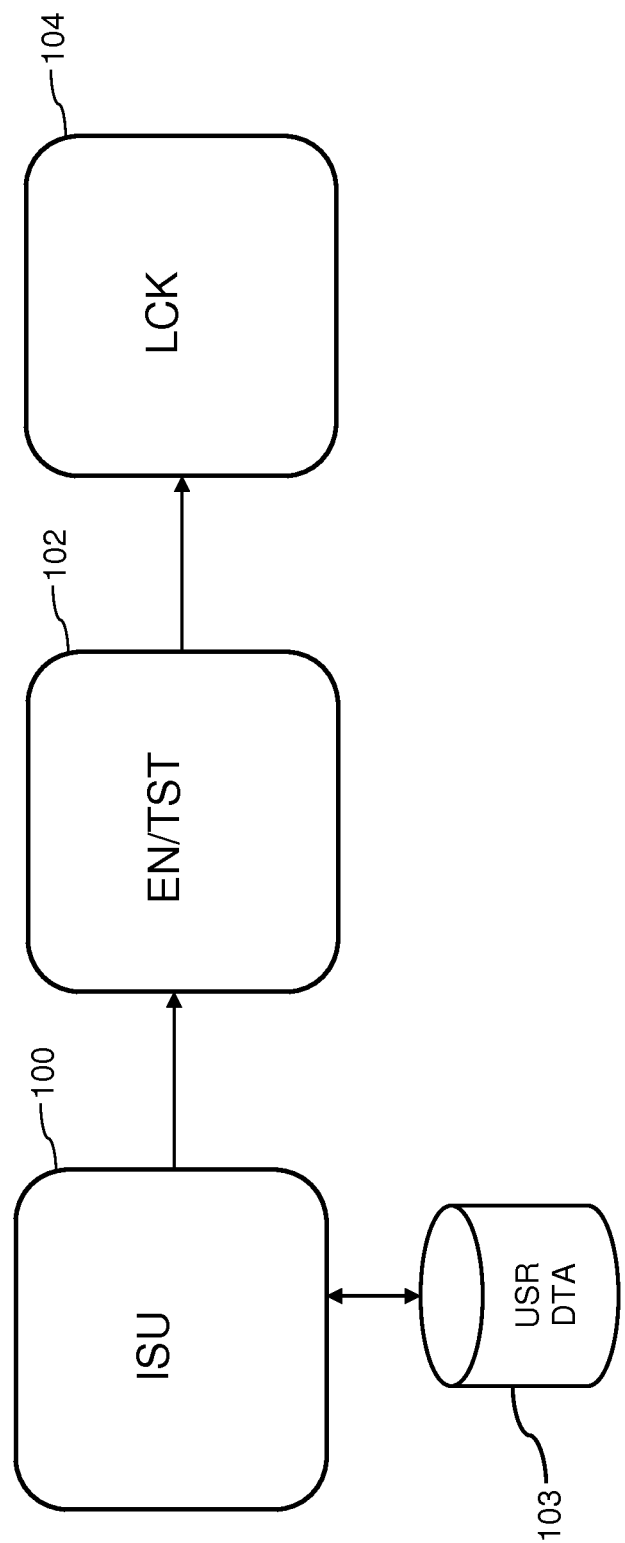
FIG. 5 illustrates a block diagram of communications used to initialize a body worn device.

Referring to FIG. 5, a block diagram of communications used to initialize a body worn device 40 is shown. For example, a body worn device 40 is issued 100 to a user (e.g. an inmate), and user data 103 is captured and/or linked to the body worn device 40. In this, either the body worn device 40 has an embedded serial number that is then linked to the user data 103 or some part of the user data 103 is uploaded and stored in the non-volatile memory 825 (see FIG. 15) of the body worn device 40. In this way, either the serial number or that part of the user data 103 is later used as part of the communications between the body worn device 40 and the base station 110 to identify the user (e.g. inmate). Once the data 103 is captured/linked and the issuance 100 is complete, this body worn device 40 is enabled and tested 102. For example, communications are established and test messages sent/received to insure proper operation. If the enablement and testing 102 is successful, the body worn device 40 is then locked 104 around, for example, the user's (e.g., inmate's) appendage.

The software operating within the body worn device 40 is also updated, as necessary, through the wireless interface.

In some embodiments, the condition of the battery in the body worn device 40 is also reported during some or all transmissions. In some embodiments, diagnostics or self-tests are performed during initialization and/or periodically and any anomalies are reported through the wireless interface.

Figure 6:
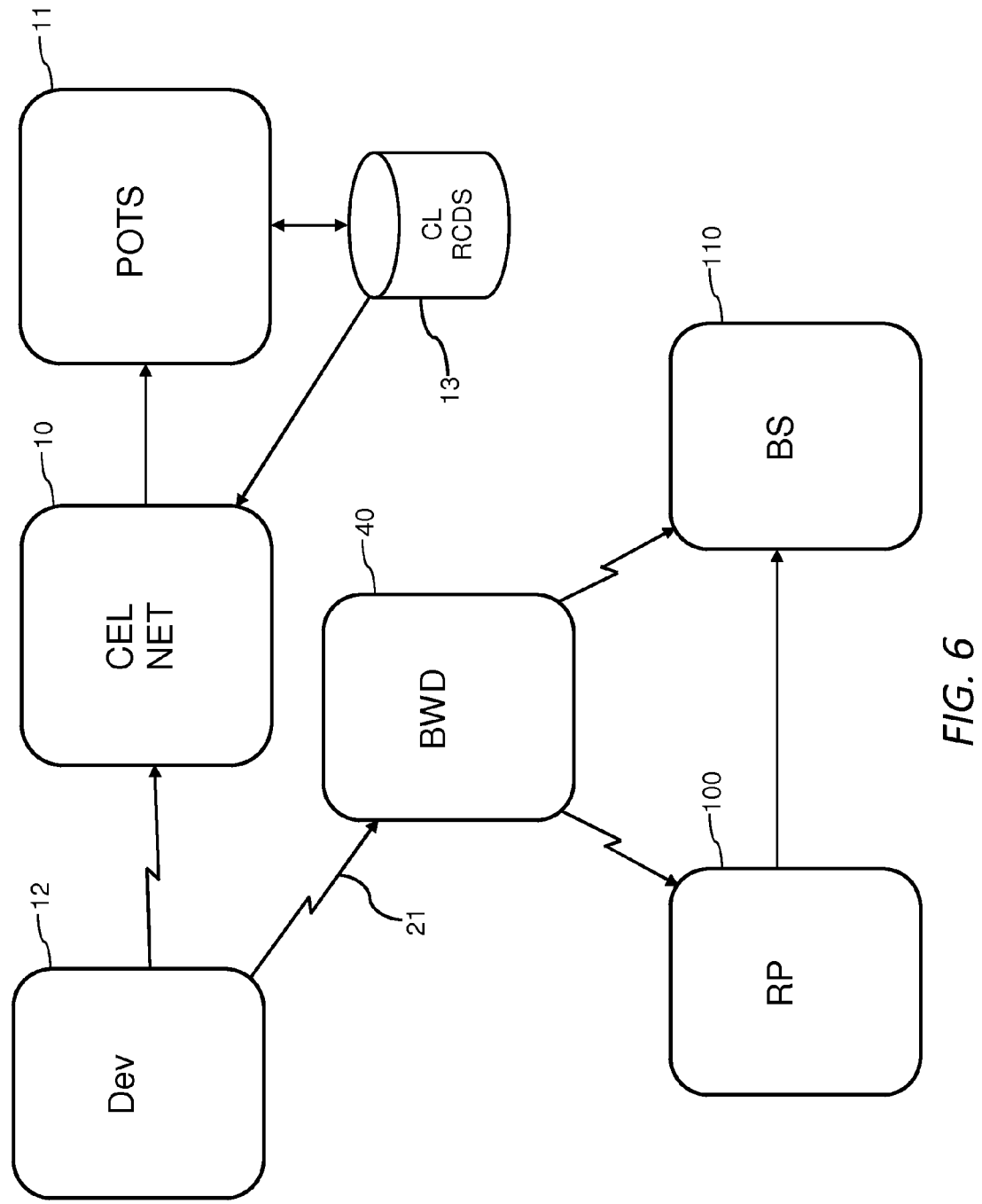
FIG. 6 illustrates a block diagram of a body worn device detecting wireless activity.
Figure 8:
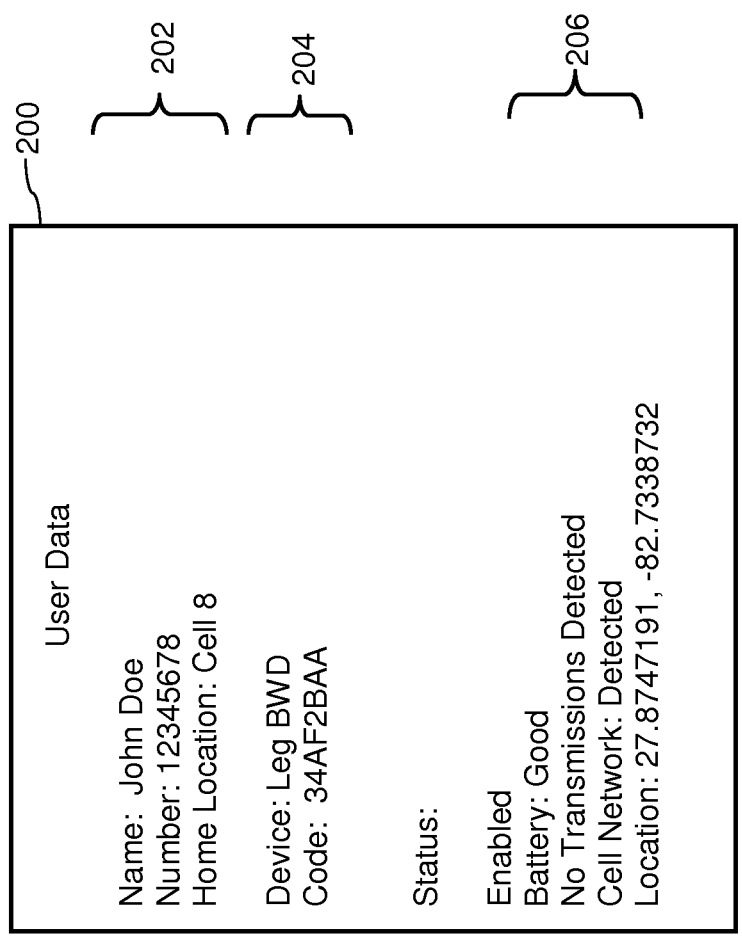
FIG. 8 illustrates an exemplary user interface showing the status of a body worn device.

Referring to FIG. 6, a block diagram of a body worn device 40 detecting wireless activity is shown. In this example, an offending device 12 (e.g. a cellular phone 12) is activated to establish a call through the cellular network 10, and for example, through the plain-old-telephone system (POTS) 11 to another person (not shown). Note that call records 13 are created to record the call, origination, destination, length of call, etc. In this example, the origination is recorded as the cell phone 12 at a certain geographic area (e.g. Manhattan). Such records are useful in after-the-fact tracking, but are not very helpful in finding the offending device 12. In this scenario, the system 50/50A within the body worn device 40 detects the radio frequency signal 21 from the offending device 12. Upon detection, the system 50/50A compiles a message including, for example, the frequency of the radio frequency signal 21, the signal strength of the radio frequency signal 21, an identification of the body worn device 40 (and/or the user or inmate), the time and/or date of the event, and, if available, the latitude and longitude of the body worn device 40. This message is optionally encrypted then transmitted from the transceiver 70 of the body worn device 40. The message is then received by either or both of an optional repeater 100 and/or a base station 110 where the message is optionally decrypted and the data is analyzed to determine the user (e.g. inmate) associated with the body worn device 40, the type of offender 12, and, optionally the location of the body worn device 40 and, therefore, the location of the user (e.g. inmate). An exemplary alert report screen that is displayed after reception of such a message by the base station 110 is shown in FIG. 8.

Although not required, the transmission of the signal/message is performed using an end-to-end protocol that assures proper reception of the signal/message. All forms of reliable transmissions are anticipated, including automatic retransmission of unacknowledged attempts, retransmission of signals/messages that were received with errors, error correcting protocols, etc. In such embodiments, once an event occurs, transmission is continually attempted until it is properly received at the base station or, in some embodiments, until it is deemed futile to continue such transmissions. In some embodiments, if a second event occurs during the transmission and/or retransmission of a first event is underway, the second event (and subsequent events as storage permits) is captured in memory (e.g. nonvolatile memory 825 (see FIG. 15) until a second (and subsequent) signal/message is sent.

In some embodiments, the system 50A within the body worn device 40 includes a positioning system 94 and the message includes, for example, the latitude and longitude of the body worn device 40. In some embodiments, the system 50 within the body worn device 40 lacks a positioning system 94 and/or positioning signals are not being received and the message cannot include a location of the body worn device 40. In such, triangulation is used to determine the location of the body worn device 40 as is described along with FIG. 7.

Figure 7:
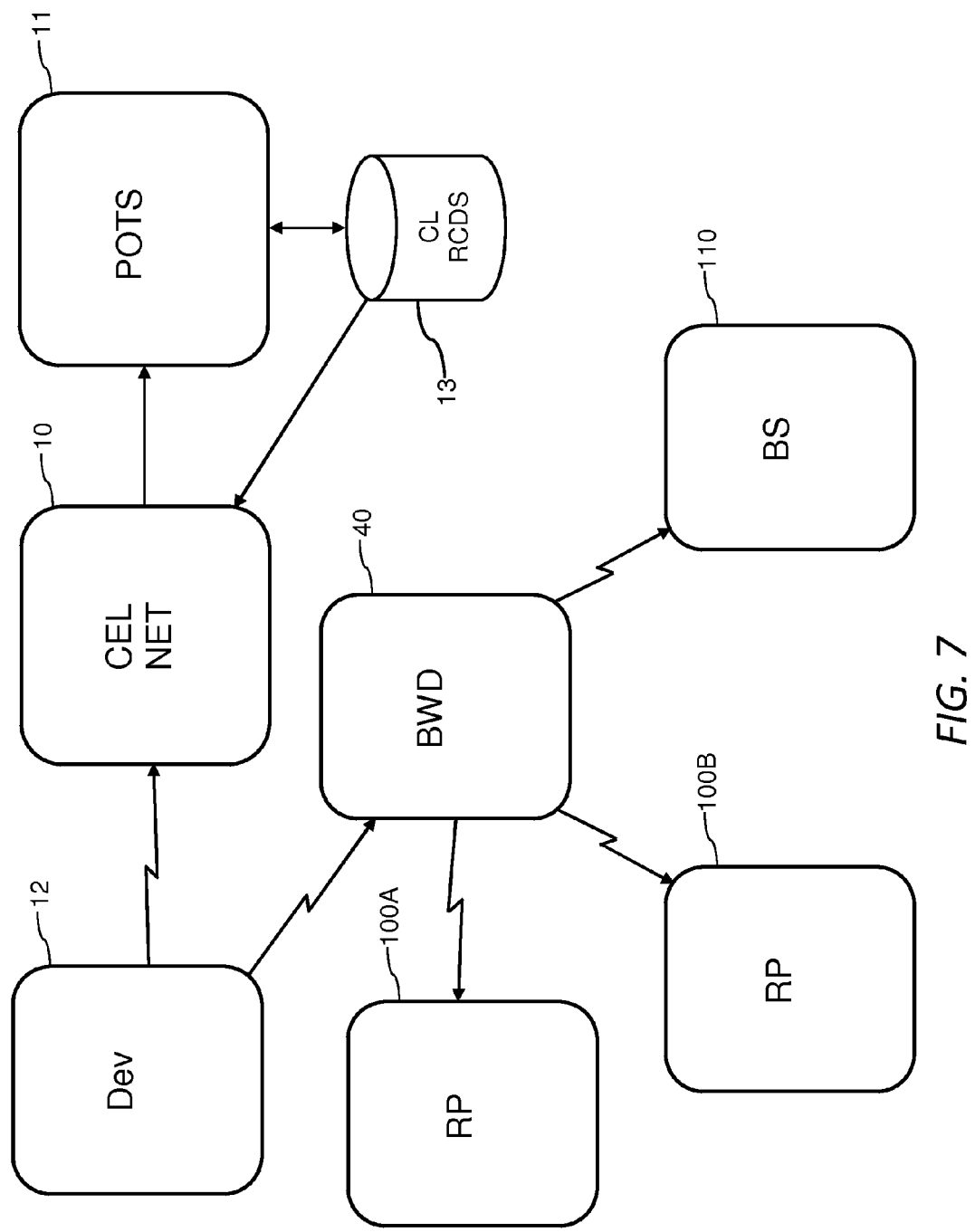
FIG. 7 illustrates a block diagram of a body worn device detecting wireless activity and location derivation of the body worn device.

Referring to FIG. 7, a block diagram of a body worn device 40 detecting wireless activity is shown in which a location of the body worn device is determined through triangulation. In this example, an offending device 12 (e.g. a cellular phone 12) is activated to establish a call through the cellular network 10, and for example, through the plain-old-telephone system (POTS) 11 to another person (not shown). Note that call records 13 are created to record the call, origination, destination, length of call, etc. In this example, the origination is recorded as the cell phone 12 at a certain geographic area (e.g. Manhattan). Such records are useful in after-the-fact tracking, but are not very helpful in finding and confiscating the offending device 12. In this scenario, the system 50 within the body worn device 40 detects the radio frequency signal 21 from the offending device 12. Upon detection, the system 50 compiles a message including, for example, the frequency of the radio frequency signal 21, the signal strength of the radio frequency signal 21, an identification of the body worn device 40 (and/or the user or inmate). In this example, the system 50 within the body worn device 40 has no positioning system 70, so there is no latitude and longitude of the body worn device 40 encoded into the message. This message is optionally encrypted then transmitted from the transceiver 70 of the body worn device 40. The message is then received by a plurality of repeaters 100A/100B and/or a base station 110 where the message is optionally decrypted and the data is analyzed to determine the user (e.g. inmate) associated with the body worn device 40, and the type of offender 12. In this example, because the body worn device 40 has no capability of reporting a location, the location of the body worn device 40 and, therefore, the location of the user (e.g. inmate) must be derived from the radio frequency signal as it is received by the plurality of repeaters 100A/100B and base stations 110. It is known how to determine the origin of a radio frequency signal through triangulation of the radio frequency signal. Triangulation is typically performed by measuring the time at which the stations 100A/100B/110 receive the signal (e.g. if the repeater 100A receives the signal first and the repeater 100B and base station 110 receive the signal at the same time a few milliseconds later, the body worn device is closer to repeater 100A and midway between the repeater 100B and the base station 110). Triangulation systems are known to accurately translate these reception times into latitude and longitude values given the latitudes and longitudes of each of the triangulating receivers 100A/100B/110. In some triangulation systems, signal strength is used either separately or in conjunction with signal timing to determine the location of the body worn device 40.

An exemplary alert report screen that is displayed after reception of such a message and triangulation by the base station 110 is shown in FIG. 8.

The following examples use a fictitious inmate, John Doe, as an example of a person assigned and wearing a body worn device 40. This does not imply that the disclosed inventions are in any way limited to prisons or correctional facilities.

Referring to FIG. 8, an exemplary user interface 200 showing the status of a body worn device 40 is shown. In this example, data pertaining to the person 202 includes an inmate name (John Doe), an inmate number (12345678), and a home location (Cell 8). Data 204 pertaining to the body worn device 40 assigned to this inmate includes a description of the device (Leg BWD) and a code (34AF2BAA) which is, for example, a serial number of this body worn device 40. Next, status 206 of the assigned body worn device 40 is shown/displayed, including an indication that the device has been enabled, a condition of the battery, whether the body worn device 40 has detected any radio frequency transmissions (No Transmissions Detected), whether the body worn device 40 detects the cellular network (Detected), and the latitude and longitude of the body worn device 40. Note that, in some embodiments, more or less information is included.

Figure 9:
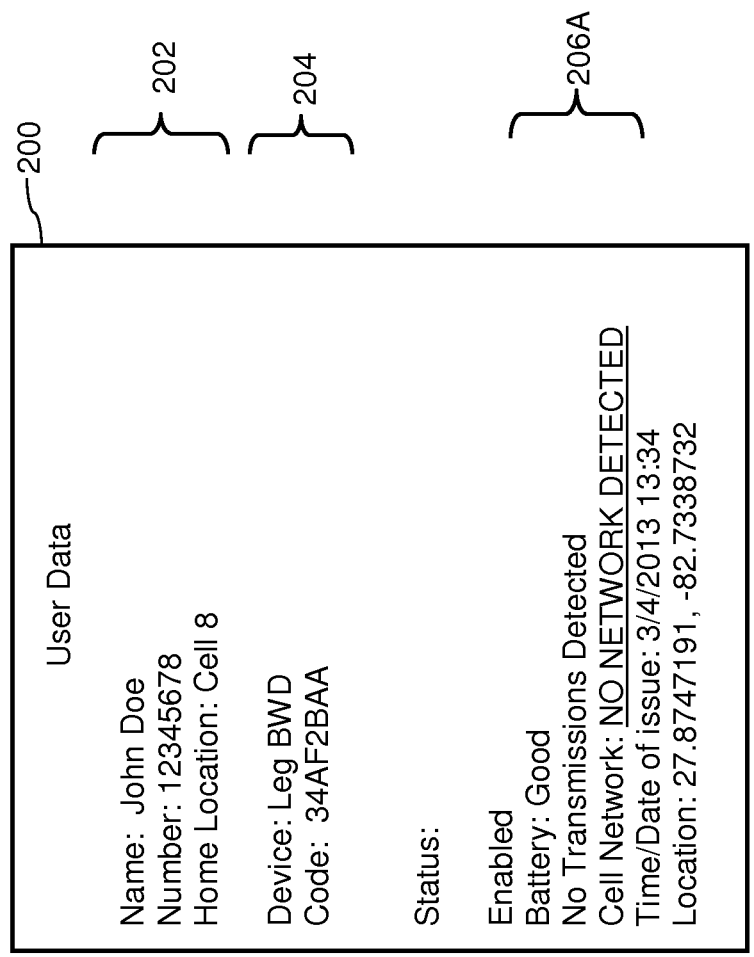
FIG. 9 illustrates an exemplary user interface showing the status of a body worn device when the body worn device has been cloaked.

Referring to FIG. 9, an exemplary user interface 200 showing the status of a body worn device 40 when the body worn device has been cloaked is shown. In this example, data pertaining to the person 202 includes an inmate name (John Doe), an inmate number (12345678), and a home location (Cell 8). Data 204 pertaining to the body worn device 40 assigned to this inmate includes a description of the device (Leg BWD) and a code (34AF2BAA) which is, for example, a serial number of this body worn device 40. Next, status 206A of the assigned body worn device 40 is shown, including an indication that the device has been enabled, a condition of the battery, a time/date of the event, whether the body worn device 40 has detected any radio frequency transmissions (No Transmissions Detected), whether the body worn device 40 detects the cellular network (Detected), and the latitude and longitude of the body worn device 40. In this case, the device is not detecting any signal from a cellular network (e.g. local tower) and, therefore, it is believed that the body worn device 40 has been cloaked by, for example, submerging the body worn device 40 in water or encapsulating the body worn device 40 in metal foil, etc. In an alternate embodiment, as will be described, heartbeat monitors are implemented to make sure each body worn device 40 is operating and hasn't been cloaked. For example, the base station 110 polls each body worn device 40 every 30 seconds and if no response is received, the status of the body worn device 40 that hasn't responded is updated and appropriate alarms are issued. In an alternate heartbeat embodiment, the timing is performed in both the base station 110 and the body worn device 40. In this, the body worn device 40 transmits a heartbeat signal or packet at a scheduled interval such as every 30 seconds. The base station 110 has a timer for each body worn device 40 that is set to an interval just longer than this schedule interval, for example 40 seconds. Each time the base station 110 receives the heartbeat signal/packet, the timer is reset to the interval (e.g. 40 seconds) and never expires. If the heartbeat is not received within the allotted time (e.g. 40 seconds), the status is updates and alarms issued as appropriate. Since there are reasons besides cloaking that a single heartbeat transmission might get lost, it is anticipated that more complicated algorithms are used to manage heartbeats and to perform other communication tests when one is missed before initiating status changes and/or alarms. Note that, in some embodiments, more or less information is included.

Figure 10:
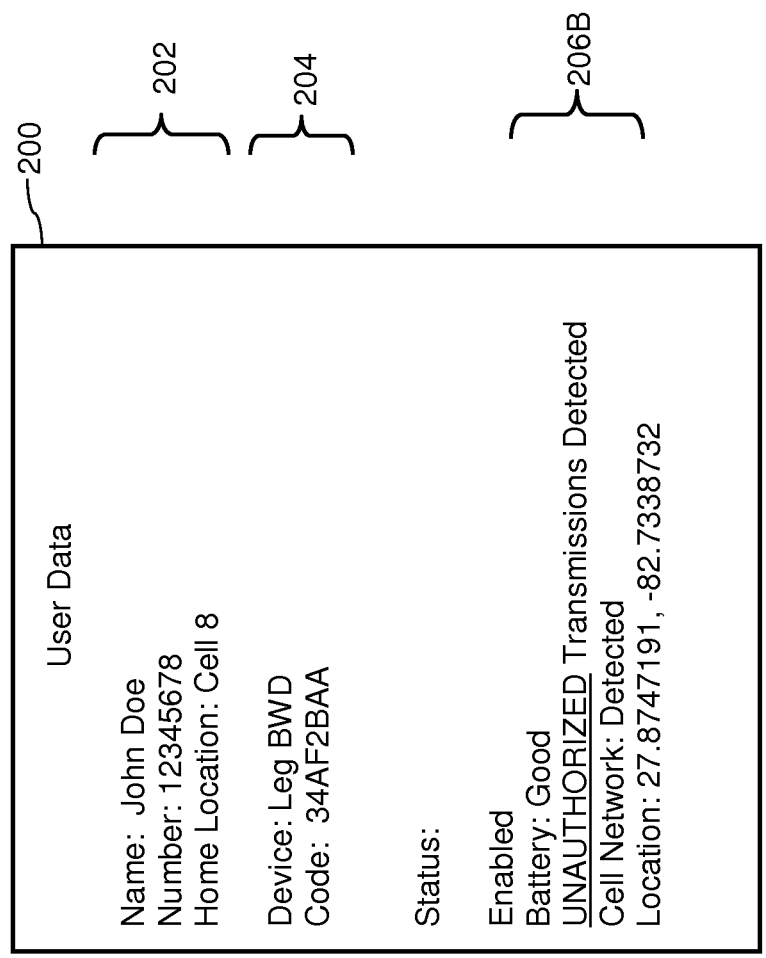
FIG. 10 illustrates an exemplary user interface showing the status of a body worn device upon detection of unauthorized communications.

Referring to FIG. 10, an exemplary user interface 200 showing the status of a body worn device 40 upon detection of unauthorized communications 21 is shown. In this example, data pertaining to the person 202 includes an inmate name (John Doe), an inmate number (12345678), and a home location (Cell 8). Data 204 pertaining to the body worn device 40 assigned to this inmate includes a description of the device (Leg BWD) and a code (34AF2BAA) which is, for example, a serial number of this body worn device 40. Next, status 206B of the assigned body worn device 40 is shown, including an indication that the device has been enabled, a condition of the battery, a time/date of the event, whether the body worn device 40 has detected any radio frequency transmissions (UNAUTHORIZED Transmissions Detected), whether the body worn device 40 detects the cellular network (Detected), and the latitude and longitude of the body worn device 40. In this example, the associated body worn device 40 has detected an unauthorized radio frequency transmission. Note that, in some embodiments, more or less information is included.

The user interface shown is an overly simplified interface for understanding purposes. It is anticipated that the Location (latitude and longitude) be used to pin point the user (e.g. inmate) within a floor map of the building to quickly find that user (e.g. inmate) and confiscate the infringing transmitting device. Furthermore, other information regarding the radio frequency signal 21 that was detected by the body worn device 40, when available, are displayed, for example, frequencies and signal strength for each frequency received, durations of signals, etc. In some embodiments, such information is further analyzed to classify the transmission device so that after confiscation, it is known whether the correct device has been confiscated. For example, if a cellular signal is detected but, after searching, only a tablet computer 15 is found, authorities know to keep searching until they find a cellular phone 12.

Figure 11:
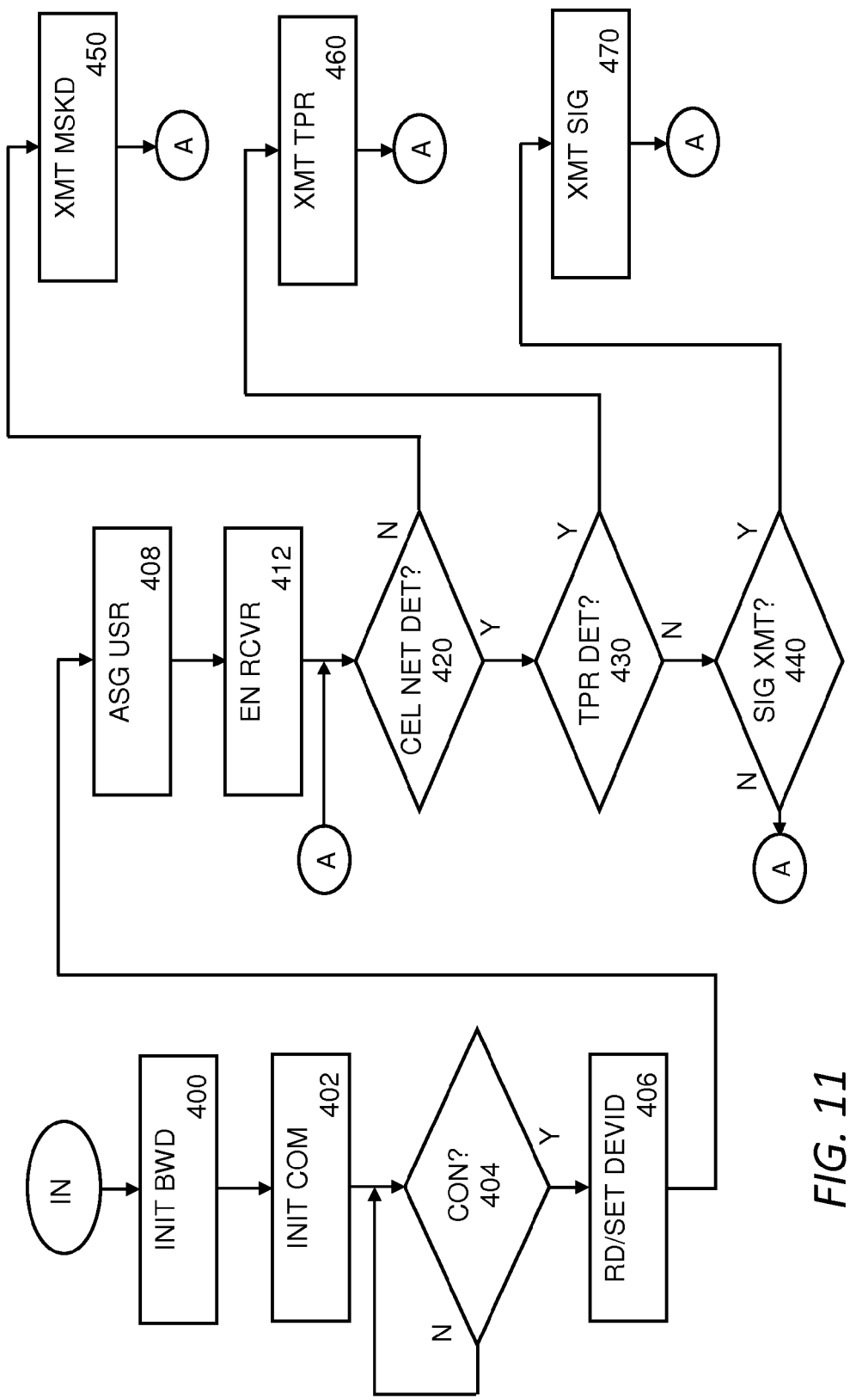
FIG. 11 illustrates a flow chart of an exemplary body worn device controller.

Referring to FIG. 11, a flow chart of an exemplary body worn device controller 60 is shown. When power is initially applied to the body worn device 40, the processor 60 initializes 400 and then initializes communications 402. For example, communications with a base station 110 is initialized 402. The system repeatedly attempts to communicate with the base station 110 until a connection is detected 404, at which time the body worn device identification is established 406. This is performed by either reading a hard or soft serial number of the body worn device 40 and transmitting that serial number to the base station 110 or by determining a unique serial number by the base station 110 and transmitting that serial number to the body worn device 40 where the serial number is then stored in non-volatile memory 825. Next, a user (e.g. inmate) is assigned 408 to that serial number so that, any future communications containing that serial number will be identifiable with that user (e.g. inmate). Now the radio frequency receiver/detector 80 is enabled 412 to monitor radio frequency transmissions in the local of the body worn device 40.

Figure 13:
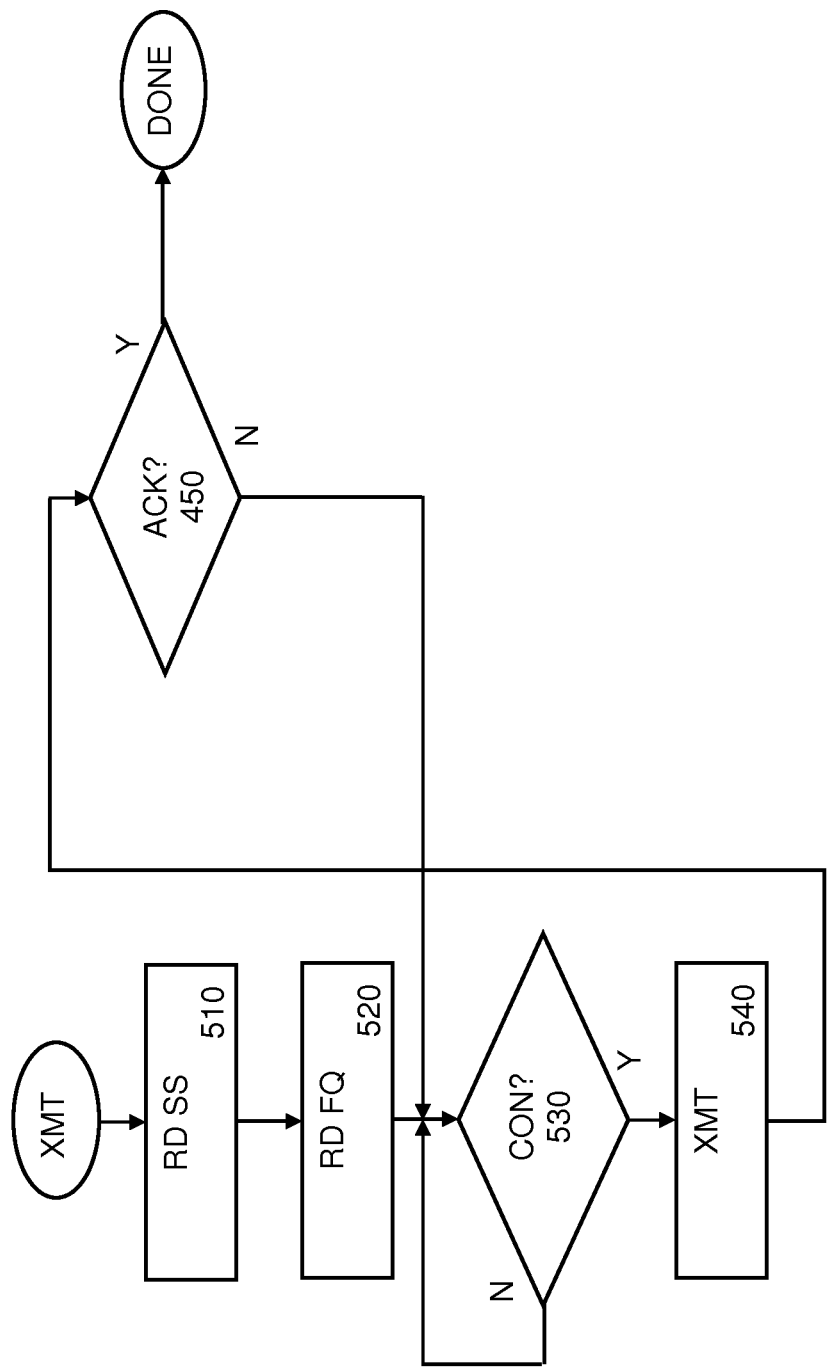
FIG. 13 illustrates a third flow chart of a typical transmission by a body worn device controller.
Figure 14:
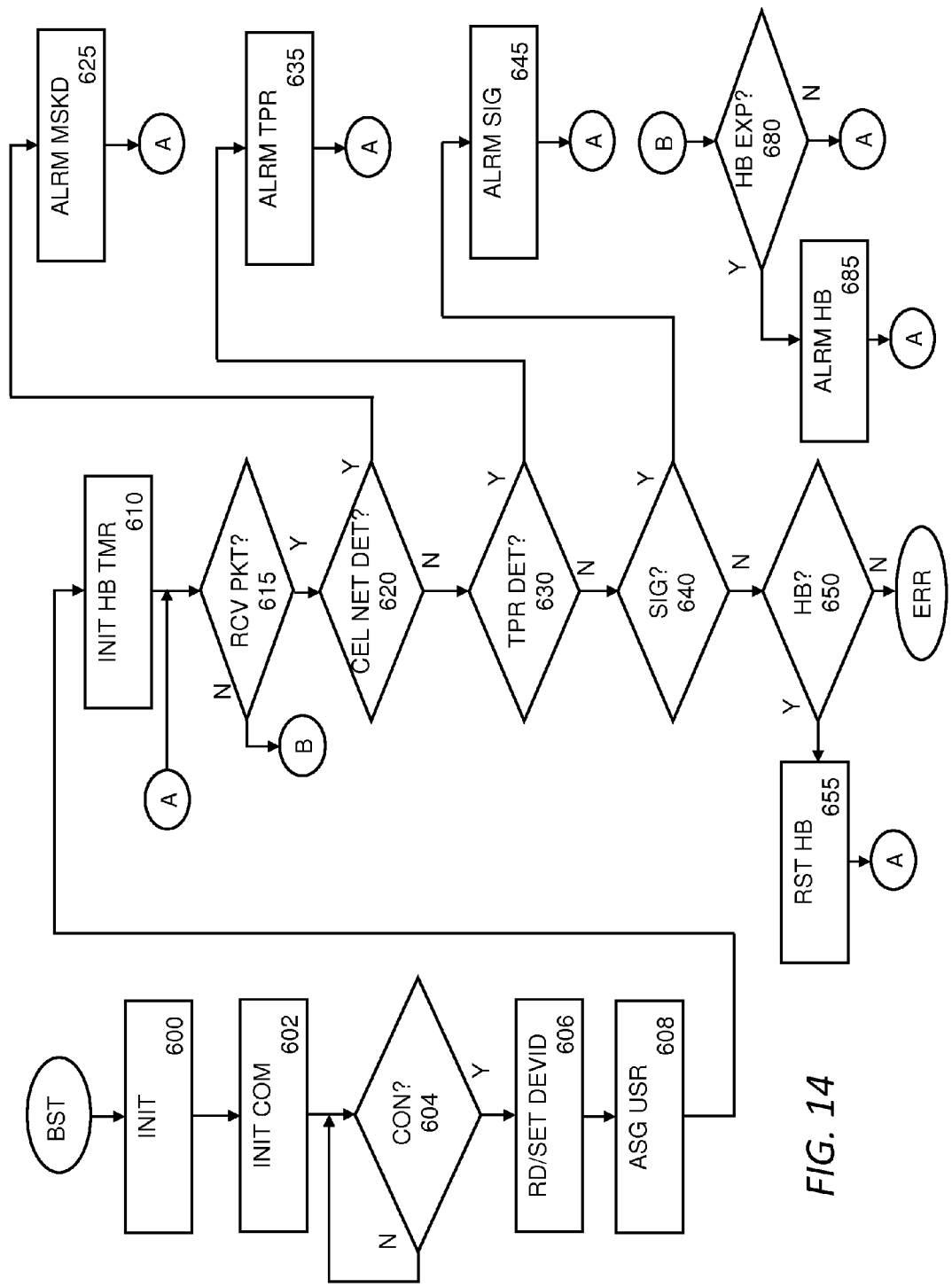
FIG. 14 illustrates a flow chart of an exemplary base station controller.

Until reset, the body worn device system 50 continuously loops, each time through the loop accessing the radio frequency receiver/detector 80 to determine if the cellular network 10 is present 420 (e.g. is the body worn device being cloaked?), accessing the tamper detection circuit 90 to determine if tampering has been detected 430, and accessing the radio frequency receiver/detector 80 to determine if there has been any unauthorized radio frequency transmission 440. If the cellular network 10 is not present 420, a signal or packet indicating that this particular body worn device 40 has been cloaked or masked 450 is sent to the base station 110. If tampering has been detected 430, a signal or packet indicating that this particular body worn device 40 has been tampered (e.g. removed, broke) 460 is sent to the base station 110. If there has been any unauthorized radio frequency transmission 440, a signal or packet indicating that this particular body worn device 40 has detected such radio frequencies is transmitted 470 is sent to the base station 110. FIG. 13 shows an exemplary flow for transmitting these signals or packets while FIG. 14 shows an exemplary flow in the base station 110 for processing receipt of these signals or packets.

Figure 12:
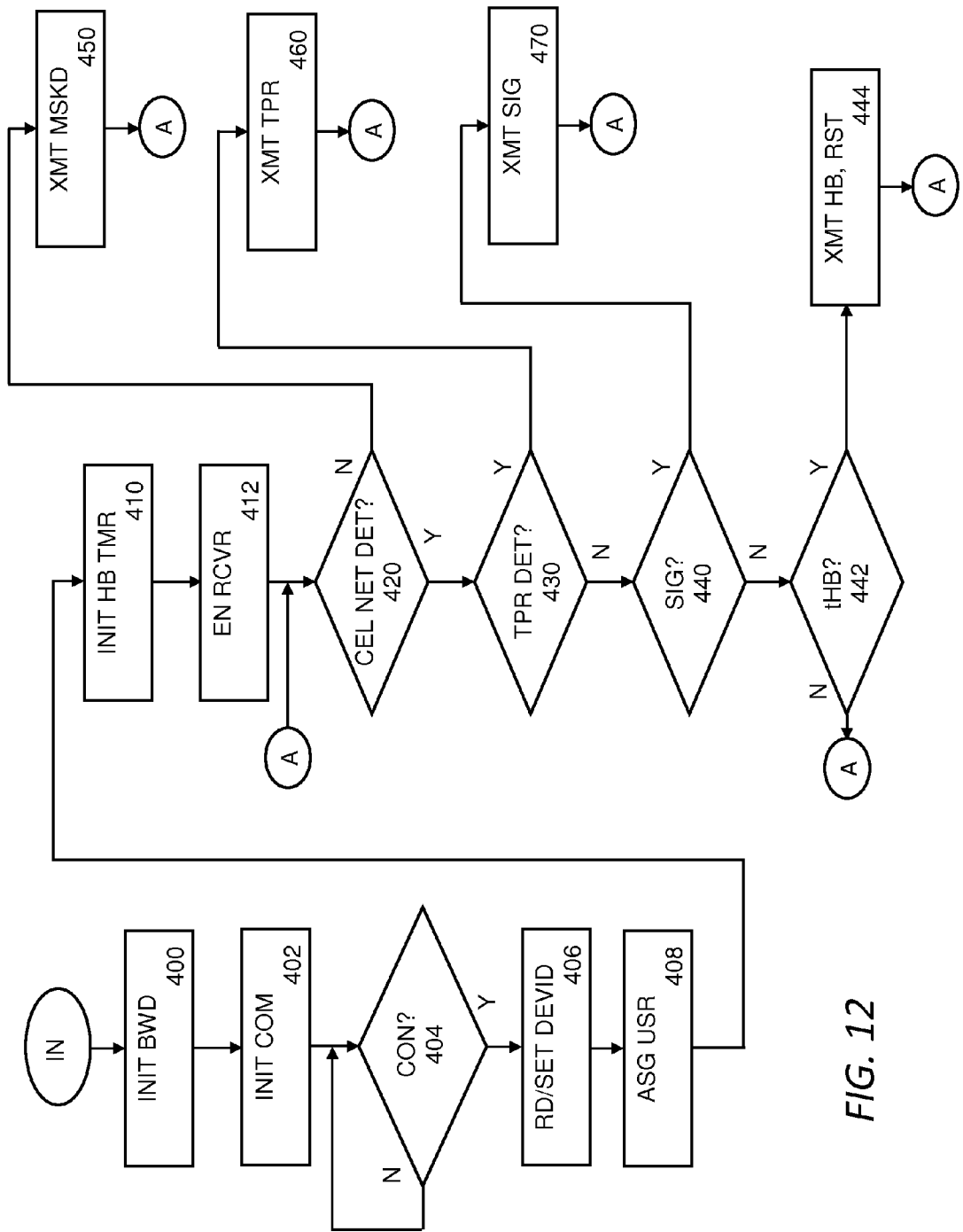
FIG. 12 illustrates a second flow chart of a second exemplary body worn device controller.

Referring to FIG. 12, a flow chart of a second exemplary body worn device controller 60 is shown. This flow is similar to that shown in FIG. 11, except implementing a heartbeat monitor to determine if the body worn device 40 has been cloaked. When power is initially applied to the body worn device 40, the processor 60 initializes 400. Next, communication is initializes 402, perhaps with a base station 110. The system repeatedly attempts to communicate with the base station 110 until a connection is detected 404, at which time the body worn device identification is established 406. This is performed by either reading a hard or soft serial number of the body worn device 40 and transmitting that serial number to the base station 110 or by determining a unique serial number by the base station 110 and transmitting that serial number to the body worn device 40 where the serial number is then stored in non-volatile memory 825. Next, a user (e.g. inmate) is assigned 408 to that serial number so that, any future communications containing that serial number will be identifiable with that user (e.g. inmate). For embodiments with a heartbeat method of detecting cloaking, the heartbeat timer is initialized 410. There are many ways to implement heartbeat monitoring, this being one of them. The basic operation has two timers, one in the base station and one in the body worn device 40. The timer in the base station is set somewhat longer than one or two periods of the timer in the body worn device 40, for example, the timer in the base station is set to 40 second and the timer in the body worn device 40 is set to 30 seconds (or 15 seconds to receive two heartbeats before the base station timer expires). Each time the heartbeat is received by the base station 110, the base station timer is reset (e.g. to 40 seconds). If no heartbeats signals/packets are receive within the base station timer interval and the base station timer expires, it is declared that the body worn device 40 has lost communications and is possibly being cloaked.

Next the radio frequency receiver/detector 80 is enabled 412 to monitor radio frequency transmissions in the local of the body worn device 40.

Until reset, the body worn device system 50 continuously loops, each time through the loop accessing the radio frequency receiver/detector 80 to determine if the cellular network 10 is present 420 (e.g. is the body worn device being cloaked?), accessing the tamper detection circuit 90 to determine if tampering has been detected 430, accessing the radio frequency receiver/detector 80 to determine if there has been any unauthorized radio frequency transmission 440, and checking the heartbeat timer in the body worn device 40 to determine if a heartbeat needs to be transmitted 442. If the cellular network 10 is not present 420, a signal or packet indicating that this particular body worn device 40 has been cloaked or masked 450 is sent to the base station 110. If tampering has been detected 430, a signal or packet indicating that this particular body worn device 40 has been tampered (e.g. removed, broke) 460 is sent to the base station 110. If there has been any unauthorized radio frequency transmission 440, a signal or packet indicating that this particular body worn device 40 has detected such radio frequencies is transmitted 470 is sent to the base station 110. If a heartbeat needs to be transmitted 442, the heartbeat signal/packet is transmitted and the heartbeat timer is reset to schedule the next heartbeat transmission 444. FIG. 13 shows an exemplary flow for transmitting these signals or packets while FIG. 14 shows an exemplary flow in the base station 110 for processing receipt of these signals or packets.

Referring to FIG. 13, a second flow chart of a typical transmission by a body worn device controller 60 is shown. In this, if available, the signal strength 510 and the signal frequency 520 are read from the radio frequency detector 80. Next, communications is attempted with the base station until a connection is established 530. Once communication is established with the base station 530, the signal or packet(s) is transmitted 540, typically including the reason for the transmission (e.g. heartbeat, radio frequency detected, loss of cellular signal, tamper detected, battery low, etc.), the identification (serial number) of the body worn device 40, optionally, the frequency and/or signal strength of the radio frequency signal, optionally the duration of the radio frequency signal, and optionally the latitude and longitude of the body worn device 40. Next, to assure that the packet/signal was received by the base station 110, the body worn device software waits for an acknowledgement 450. If an acknowledgement is received 450, the transmission process is complete (e.g. returns to the loops of FIG. 11 or FIG. 12. If an acknowledgement is not received 450 (e.g. within an expected time frame), the transmission process is repeated from step 530.

The simplified example of transmitting between the body worn device 40 and the base station 110 as described is but an example as reliable data transmission is well known and many methods and protocols exist to perform such transmissions. The exemplary program flows described here within are but examples and one skilled in the art will readily be able to produce a transmission mechanism capable of such communication.

Referring to FIG. 14, a flow chart of a base station controller 900 (see FIG. 16) is shown. The described flow generally operates on a processor within, for example the base station 110. As known in the industry, this control flow is often implemented as an application that runs, along with other applications, on a dedicated or multi-purpose computer system, an example of which is shown in FIG. 16. The described application is threaded to monitor one single body worn device 40, though it is anticipated that many body worn devices 40 are present and monitored by a similar application or multiple instantiations of this exemplary process flow.

The following relates to communications with one or many body worn device 40. When the application starts running, general initialization is performed 600, communications is initialized 602, and then communication with the target body worn device(s) 40 is established 604, looping until communication is made. Once communications are established 604, the identification of the body worn device 40 is read or set 606 (as described with FIGS. 11 and 12), establishing an identifier (e.g., serial number) of the body worn device 40 and a user (e.g. inmate) is assigned to that identifier 608. In systems in which there is a heartbeat, a heartbeat timer is initialized 610 as described previously.

Now a loop is entered. The first step of the loop is to determine if a packet or signal has been received 615 from the body worn device 40. If no packet or signal has been received 615, the heartbeat timer is checked for expiration 680 (e.g. the timer expires if no heartbeats are received within the heartbeat timer interval). If the heartbeat timer expired 680, an appropriate indication/alarm is made 685 (e.g. message display, flashing light, etc.) and the loop continues.

If a packet or signal has been received 615 from the body worn device 40, a determination of the type of packet or signal is made. If the packet/signal indicates that the body worn device 40 has lost presence of a cellular network signal 620 (e.g. it is cloaked), an appropriate indication/alarm is made 625 (e.g. message display, flashing light, etc.) and the loop continues.

If the packet/signal indicates that the body worn device 40 has been tampered with 630 (e.g. it has been removed from the user/inmate), an appropriate indication/alarm is made 635 (e.g. message display, flashing light, etc.) and the loop continues.

If the packet/signal indicates that the body worn device 40 detected an unauthorized radio frequency transmission 640, an appropriate indication/alarm is made 645 (e.g. message display, flashing light, etc.—hopefully alerting staff/guards to confiscate the offending device) and the loop continues.

If the packet/signal indicates that the body worn device 40 is sending a heartbeat signal 650, the heartbeat timer is reset 655 and the loop continues.

If none of the above (e.g., an unknown packet/signal was received), an error is recorded and appropriate actions taken to restore the system to level of operation such as a complete reset, etc.

Figure 15:
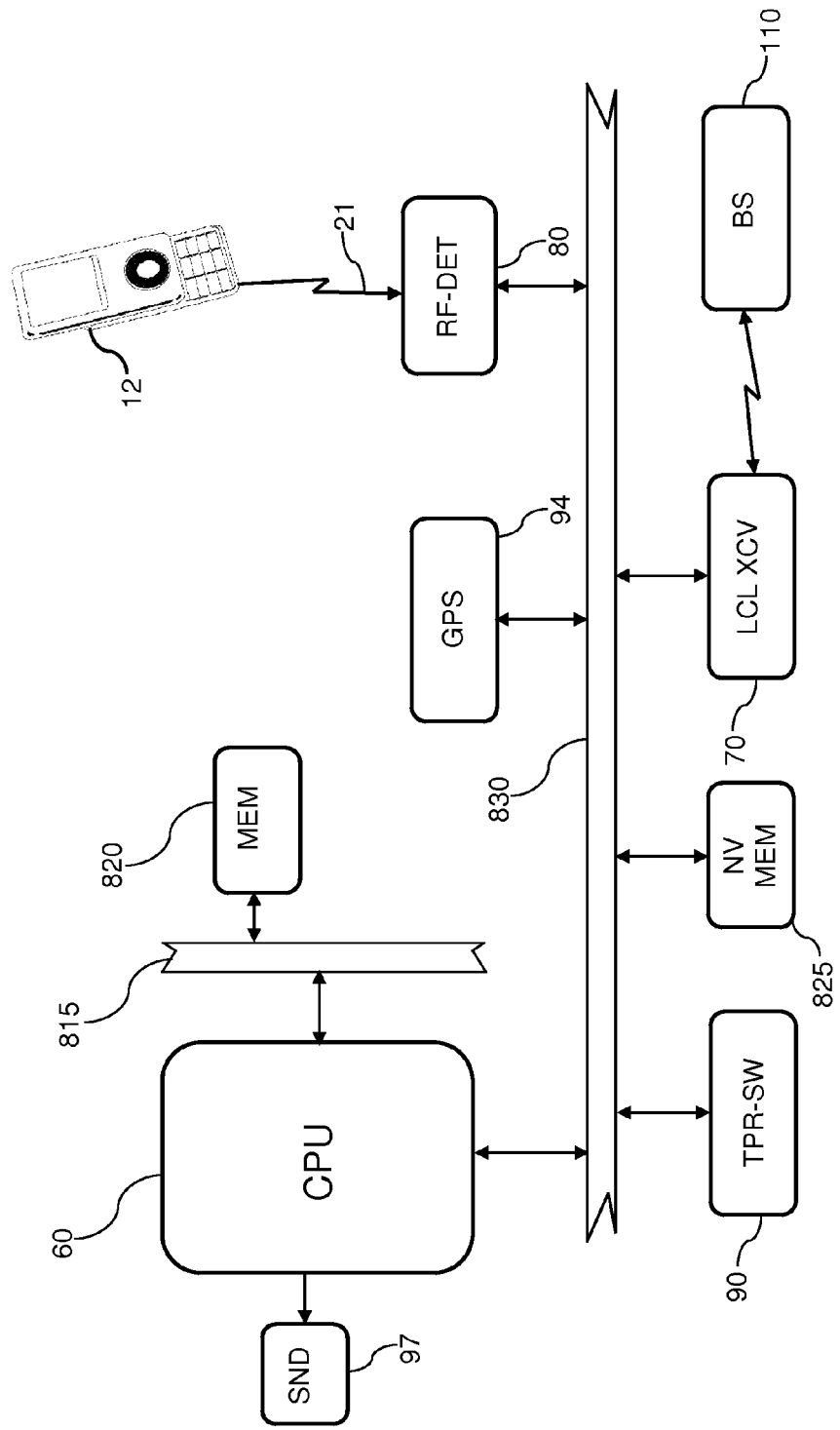
FIG. 15 illustrates a schematic view of a typical computer-based body worn device system.

Referring to FIG. 15, a schematic view of an exemplary system 50/50A of the body worn device 40 is shown. The example system represents an exemplary processor-based system housed in a body worn device 40. Although, throughout this description, a processor-based system is described, it is known to implement the same or similar functionality in a system of logic or analog components providing similar functionality in an equivalent system. The power subsystem 98 (e.g., battery, power management, charge control, etc.) is known in the art and is not shown for clarity reasons.

The exemplary system of the body worn device 50 is shown in its simplest form, having a single processor 60 (e.g., controller, microcontroller, microprocessor, etc.). Many different computer architectures are known that accomplish similar results in a similar fashion and the present invention is not limited in any way to any particular processing element 60. In exemplary system of the body worn device 50, a processor 60 executes or runs stored programs that are generally stored for execution within a memory 820. The processor 60 is any processor, for example an Intel 80C51 single chip processor or the like. The memory 820 is connected to the processor by a memory bus 815 and is any memory 820 suitable for connection with the selected processor 60, such as SRAM, DRAM, SDRAM, RDRAM, DDR, DDR-2, etc. Also connected to the processor 60 is a system bus 830 for connecting to peripheral subsystems. In general, the non-volatile memory 825 is interfaced to the processor 60 through the system bus 830 and is used to store programs, executable code and data persistently. Examples of persistent storage include core memory, FRAM, flash memory, etc.

In embodiments in which Global Positioning is included, a positioning system 94 (e.g. GPS) is interfaced to the processor 60 by the system bus 830. In such, the processor controls the positioning system 94 operation by sending commands to the positioning system 94 over the system bus 830 and receiving status and data back in a similar manner (e.g. latitude and longitude).

The Radio Frequency Detection subsystem 80 is also interfaced to the processor 60 by the system bus 830. In such, the processor controls the operation of the Radio Frequency Detection subsystem 80 by sending commands to the Radio Frequency Detection subsystem 80 over the system bus 830 and receiving status and data back in a similar manner (e.g. signal frequency and strength).

The tamper detection subsystem 90 is also interfaced to the processor 60 by, for example, the system bus 830 (or through an input/output port, etc.). In such, the processor controls the operation of the tamper detection subsystem 90 by sending commands to the tamper detection subsystem 90 over the system bus 830 and receiving status and data back in a similar manner (e.g. intact or "device removed from body," etc.).

The body worn device 50 communicates with the land based system (e.g. base stations 110) through a wireless interface and transceiver 70. The wireless interface and transceiver 70 is also interfaced to the processor 60 by, for example, the system bus 830 (or through an input port, etc.). In such, the processor communicates with and controls the operation of the wireless interface and transceiver 70 by sending commands and data to the wireless interface and transceiver 70 over the system bus 830 and receiving status and data back in a similar manner.

Although a specific architecture is shown connecting the various subsystems 94/80/90/825/70 to the processor 60, any known interface is anticipated including, but not limited to, parallel bus architectures, serial bus architectures, parallel/serial bus architectures, input/output port interfaces, Inter-Integrated Circuit links ($I^2C$—two-wire interface), etc.

In some embodiments, a sound emitting device 97 is interfaced to the processor 60, in this example, through an output pin, though any form of connection is anticipated, including an interface to the bus 830. Any type of sound emitting device 97 is anticipated such as a piezoelectric element, speaker, electromechanical vibrator, indirect sound emitter, etc. In some embodiments, the sound emitting device is driven directly by the processor 60; while in other embodiments, the sound emitting device includes driver circuitry such as an oscillator and/or power amplifier.

Referring to FIG. 16, a schematic view of an exemplary system of the base station 110 is shown. The example system represents an exemplary processor-based system. Although, throughout this description, a processor-based system is described, it is known to implement the same or similar functionality in a system of logic or analog components providing similar functionality in an equivalent system.

The exemplary base station 110 as shown in its simplest form has a single processor 900 (e.g., controller, microcontroller, microprocessor, etc.). Many different computer architectures are known that accomplish similar results in a similar fashion and the present invention is not limited in any way to any particular processing element 900. In exemplary systems, a processor 900 executes or runs stored programs that are generally stored for execution within a memory 920. The processor 900 is any processor. The memory 920 is connected to the processor by a memory bus 915 and is any memory 920 suitable for connection with the selected processor 900, such as SRAM, DRAM, SDRAM, RDRAM, DDR, DDR-2, etc. Also connected to the processor 900 is a system bus 930 for connecting to peripheral subsystems. In general, the secondary storage 925 is interfaced to the processor 900 through the system bus 930 and is used to store programs, executable code and data persistently. Examples of secondary storage 925 include semiconductor disks, rotating media, hard disks, CD-ROM, DVD-RW, CD-RW, flash memory, etc.

The base station 110 communicates with the body worn devices 40 through a wireless interface and transceiver 935. The wireless interface and transceiver 935 is preferably interfaced to the processor 900 by, for example, the system bus 930 but alternately interfaces through an input port, etc. The processor 900 communicates with and controls the operation of the wireless interface and transceiver 935 by sending commands and data to the wireless interface and transceiver 935 over the system bus 930 and receiving status and data back in a similar manner.

For completeness, optional input and output devices 980/990 are shown such as a display 980 and a keyboard 990, though many different back end architectures are anticipated including one or more processors/computer systems, linked together for distribution and/or redundancy reasons along with a variety of input and output devices optionally including any or all of card readers, badge readers, indicator lights, lighting control systems, audible alarms, interfaces to cell locking systems, interfaces to door locking systems, camera systems, motion detection systems, door open/closed detection systems, etc.

In some embodiments, the base station 110 also includes tamper detection 985 similar or different from the tamper detection subsystem 90 of the body worn device 40. In such, intrusion into the base station 110 and/or relocation of the base station outside of a given allowed area is determined, recorded, and/or alerted. For example, in one embodiment, the tamper detection 985 includes a positioning device (e.g., GPS) that constantly monitors the location of the base station 110. If the base station 110 is moved to a new location that is outside of a predetermined area, alerts are made such as transmitting an alert to other base stations 110 or repeaters 100, locking/encrypting data, etc. Other types of base station tamper detectors 985 are anticipated, including, but not limited to, motion sensors, accelerometers, etc. It is also anticipated that the base station 110 be physically affixed to furniture to reduce chances of removal.

In some embodiments, the base station 110 (and/or the repeaters 100) is/are mobile devices, allowing for the base station 110 to be portable and carried by guards, staff, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for detecting radio frequency emitting devices, the system comprising:
   at least one base station, the base station including a base station processor and a base station transceiver, the base station transceiver operatively coupled to the base station processor;
   a plurality of body worn devices, each body worn device comprising a processor, a transceiver operatively coupled to the processor, a radio frequency detector, the radio frequency detector operatively coupled to the processor, and a source of power, the source of power providing operational power to the processor, to the transceiver, and to the radio frequency detector;
   software running on the processor of the body worn device communicates with the radio frequency detector and, if a target radio frequency is detected by the radio frequency detector, the software initiates a communication from the transceiver to the base station transceiver indicating that the target radio frequency was detected; and
   upon receipt of the communication indicating that the target radio frequency was detected by the base station transceiver, software running on the base station processor determines the offending body worn device and signals an alert.

2. The system for detecting radio frequency emitting devices of claim 1, wherein the body worn devices further comprise a positioning system and a location of the body worn device is included in the communication.

3. The system for detecting radio frequency emitting devices of claim 2, wherein the location is represented as numeric values representing a longitude and a latitude.

4. The system for detecting radio frequency emitting devices of claim 1, wherein the base station comprises at least three transceivers, each having an antenna and the antenna are spatially distributed such that, using signal timing and/or signal strength, the base station determines the location of the body worn device after the communication is sent from the body worn device.

5. The system for detecting radio frequency emitting devices of claim 1, wherein the body worn devices further comprise a tamper detection system and upon detection of any tampering or removal of the body worn device, the processor receives a signal from the tamper detection system and the processor initiates a communication from the transceiver to the base station transceiver indicating the occurrence of tampering.

6. The system for detecting radio frequency emitting devices of claim 5, wherein upon receipt of the tamper communication from the transceiver, the software running on the base station processor signals the occurrence of the tampering.

7. A method of detecting a radio frequency emission, the method comprising:
   (a) monitoring a predetermined radio frequency at a body worn device;
   (b) if the predetermined radio frequency of at least a predetermined radio frequency strength is detected, transmitting a signal from a transmitter of the body worn device to a receiver of a base station, the signal including an identification of the body worn device; and
   (c) upon receiving the signal, issuing an alarm indicative of the predetermined radio frequency and the identification of the body worn device.

8. The method of claim 7, further comprising:
   determining a location of the body worn device and including the location of the body worn device in the alarm.

9. The method of claim 8, whereas the step of determining the location of the body worn device is performed by a position measurement device of the body worn device.

10. The method of claim 8, whereas the step of determining the location of the body worn device comprises the step of triangulating of the signal by the base station.

11. The method of claim 7, further comprising the steps of:
    determining if the body worn device has been tampered at the body worn device;
    responsive to determining the body worn device has been tampered, sending a second signal from the body worn device to the base station indicating the body worn device has been tampered, the second signal including an indication of the tamper and the identification of the body worn device;
    receiving the second signal by the base station; and
    responsive to the second signal, issuing a second alarm indicative of the tampering and the identification of the body worn device.

12. The method of claim 7, further comprising the steps of:
    determining if the body worn device has been cloaked;
    responsive to determining that the body worn device has been cloaked, sending a third signal from the body worn device to the base station indicating that the body worn device has been cloaked, the third signal including an indication of the cloak and the identification of the body worn device;
    receiving the third signal by the base station; and
    responsive to the third signal, issuing a third alarm indicative of the cloaking and the identification of the body worn device.

13. The method of claim 12, wherein the step of determining if the body worn device has been cloaked comprises:

periodically sending a heartbeat signal from the base station to the body worn device;
responsive to the body worn device receiving the heartbeat signal, the body worn device acknowledges receipt of the heartbeat signal;
if the body worn device does not acknowledge receipt of the heartbeat signal, issuing a cloaking alarm.

14. The method of claim 7, further comprising the steps of:
Periodically sending a heartbeat signal from the body worn device to the base station;
if the base station does not receive the heartbeat signal from the body worn device at least once during a predetermined interval, issuing a third alarm indicative that the body worn device was cloaked and the identification of the body worn device.

15. A computer-based system for detecting radio frequency transmissions, the computer-base system comprising:
a body worn device, the body worn device comprising a processor, a wireless transceiver communicatively coupled to the processor, and a radio frequency transmission detector interfaced to the processor, the radio frequency transmission detector adapted to detect a radio frequency transmission of at least one frequency and at a power level above a predetermined threshold for each of the at least one frequency;
a base station, the base station comprising a base station processor and a base station transceiver, the base station transceiver wirelessly coupled to the wireless transceiver, thereby providing a wireless communication channel between the processor and the base station processor;
software running on the processor monitors the radio frequency transmission detector and, upon detection of any of the at least one frequency exceeding a corresponding threshold of the predetermined threshold for each of the at least one frequency, the processor formats a signal and sends the signal through the wireless communication channel to the base station processor; and
software running on the base station processor monitors the base station transceiver and upon detection of the signal, the software running on the base station processor signals an alarm.

16. The computer-based system for detecting radio frequency transmissions of claim 15, wherein the signal comprises an identification of the body worn device.

17. The computer-based system for detecting radio frequency transmissions of claim 15, wherein the body worn device further comprises a location determining device and the processor encodes a location of the body worn device into the signal.

18. The computer-based system for detecting radio frequency transmissions of claim 17, wherein the location determining device is a Global Positioning Satellite (GPS) receiver.

19. The computer-based system for detecting radio frequency transmissions of claim 15, wherein the body worn device further comprises a tamper determining device operatively coupled to the processor and upon tampering, the software running on the processor detects the tampering, formats a tamper signal comprising an identification of the body worn device, and sends the tamper signal to the base station processor through the communication channel, and upon receipt of the tamper signal, the software running on the base station signals a tamper alarm.

20. The computer-based system for detecting radio frequency transmissions of claim 15, wherein the software running on the body worn device periodically formats a heartbeat signal comprising an identification of the body worn device, and sends the tamper signal to the base station processor through the communication channel, and upon receipt of the tamper signal, the software running on the base station resets a heartbeat timer, whereas, upon expiration of the heartbeat timer, the software running on the base station signals a lost-communications alarm.

* * * * *